United States Patent
Dong et al.

(10) Patent No.: US 12,156,180 B2
(45) Date of Patent: Nov. 26, 2024

(54) DATA TRANSMISSION RESOURCE DETERMINING METHOD, DEVICE, AND SYSTEM

(71) Applicant: HUAWEI TECHNOLOGIES CO., LTD., Shenzhen (CN)

(72) Inventors: Lei Dong, Shanghai (CN); Jinfang Zhang, Shenzhen (CN); Lei Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 423 days.

(21) Appl. No.: 17/701,824

(22) Filed: Mar. 23, 2022

(65) Prior Publication Data

US 2022/0217681 A1   Jul. 7, 2022

Related U.S. Application Data

(63) Continuation of application No. PCT/CN2019/107525, filed on Sep. 24, 2019.

(51) Int. Cl.
*H04W 72/02* (2009.01)
*H04L 1/08* (2006.01)
(Continued)

(52) U.S. Cl.
CPC ............... *H04W 72/02* (2013.01); *H04L 1/08* (2013.01); *H04W 72/0446* (2013.01); *H04W 72/0453* (2013.01); *H04W 92/18* (2013.01)

(58) Field of Classification Search
CPC ............ H04L 1/08; H04L 1/18; H04W 72/02; H04W 72/0446; H04W 72/0453; H04W 72/20; H04W 92/18
See application file for complete search history.

(56) References Cited

U.S. PATENT DOCUMENTS 10,701,677 B2 * 6/2020 Park ................. H04W 74/0816
10,917,208 B2 * 2/2021 Shao ..................... H04L 5/0092
(Continued)

FOREIGN PATENT DOCUMENTS

| CN | 103516492 A | 1/2014 |
|---|---|---|
| CN | 104796238 A | 7/2015 |

(Continued)

OTHER PUBLICATIONS

3GPP TS 36.355 V14.1.0:"3rd Generation Partnership Project; Technical Specification Group Radio Access Network; Evolved Universal Terrestrial Radio Access (E-UTRA);LTE Positioning Protocol (LPP)(Release 14)",Mar. 2017.total 164 pages.

(Continued)

*Primary Examiner* — Eric Nowlin
(74) *Attorney, Agent, or Firm* — HAUPTMAN HAM, LLP

(57) ABSTRACT

A data transmission resource determining method includes determining an initial time interval and an interval difference, and determining, based on a initial time interval and a interval difference, a time domain position of a first time-frequency resource in response to the first TB being transmitted for an $i^{th}$ time, where i is a positive integer, and $2 \leq i \leq R_{max}+1$. The initial time interval is between a time domain position at which a first transport block (TB) is transmitted for the first time and the second time. The interval difference is a difference between a first and a second time interval. The first time interval is between a corresponding time domain position at which the first TB is transmitted for a $k^{th}$ h time and $(k+1)^{th}$ time. The second time interval is between a corresponding time domain position at which the first TB is transmitted for the $(k+1)^{th}$ time and $(k+2)^{th}$ time.

20 Claims, 9 Drawing Sheets

(51) Int. Cl.
*H04W 72/0446* (2023.01)
*H04W 72/0453* (2023.01)
*H04W 92/18* (2009.01)

(56) References Cited

U.S. PATENT DOCUMENTS

| | | | | |
|---|---|---|---|---|
| 10,965,407 | B2* | 3/2021 | Ying | H04L 1/0643 |
| 11,050,524 | B2* | 6/2021 | Shao | H04W 80/08 |
| 11,265,877 | B2* | 3/2022 | Kang | H04W 72/0453 |
| 11,317,382 | B2* | 4/2022 | Lee | H04W 4/40 |
| 11,363,626 | B2* | 6/2022 | Zhou | H04L 5/0094 |
| 11,419,131 | B2* | 8/2022 | Vos | H04L 1/0071 |
| 11,503,579 | B2* | 11/2022 | Shin | H04L 5/0053 |
| 11,576,015 | B2* | 2/2023 | Lee | H04W 4/06 |
| 11,622,343 | B2* | 4/2023 | Wang | H04W 72/542 |
| | | | | 370/252 |
| 11,800,531 | B2* | 10/2023 | Shin | H04W 72/30 |
| 11,956,679 | B2* | 4/2024 | Cao | H04B 17/318 |
| 2015/0207595 | A1* | 7/2015 | Oizumi | H04W 72/23 |
| | | | | 370/329 |
| 2017/0141903 | A1* | 5/2017 | Xu | H04L 5/0055 |
| 2017/0332358 | A1* | 11/2017 | Park | H04L 1/1671 |
| 2019/0334670 | A1* | 10/2019 | Shao | H04W 72/21 |
| 2020/0014493 | A1* | 1/2020 | Shao | H04L 1/189 |
| 2020/0187207 | A1* | 6/2020 | Kang | H04W 72/02 |
| 2020/0280961 | A1* | 9/2020 | Lee | H04W 4/40 |
| 2021/0051525 | A1* | 2/2021 | Cao | H04W 28/26 |
| 2021/0127365 | A1* | 4/2021 | Wang | H04W 72/542 |
| 2021/0219329 | A1* | 7/2021 | Zhou | H04L 5/0053 |
| 2021/0243731 | A1* | 8/2021 | Shin | H04W 52/0229 |
| 2021/0243749 | A1* | 8/2021 | Hoang | H04W 74/085 |
| 2021/0274536 | A1* | 9/2021 | Shin | H04W 72/535 |
| 2021/0400681 | A1* | 12/2021 | Wang | H04W 72/0446 |
| 2022/0322365 | A1* | 10/2022 | Yoshioka | H04W 72/12 |
| 2023/0058037 | A1* | 2/2023 | Yeo | H04W 72/0453 |
| 2024/0063956 | A1* | 2/2024 | Ko | H04W 4/40 |

FOREIGN PATENT DOCUMENTS

| | | | | |
|---|---|---|---|---|
| CN | 109474311 A | | 3/2019 | |
| CN | 109495219 A | | 3/2019 | |
| CN | 110034864 A | | 7/2019 | |
| CN | 111385880 A | * | 7/2020 | ........ H04W 72/0446 |
| CN | 112703812 A | * | 4/2021 | ........... H04W 24/08 |
| CN | 114175781 A | * | 3/2022 | ........... H04B 17/318 |
| CN | 111385880 B | * | 11/2022 | ........ H04W 72/0446 |
| EP | 3672338 B1 | * | 11/2022 | .............. H04W 4/40 |
| KR | 20210056327 A | * | 5/2021 | |
| WO | 2018080274 A1 | | 5/2018 | |
| WO | 2018182263 A1 | | 10/2018 | |
| WO | 2018202026 A1 | | 11/2018 | |
| WO | 2019059195 A1 | | 3/2019 | |
| WO | 2019095799 A1 | | 5/2019 | |
| WO | 2019098937 A1 | | 5/2019 | |
| WO | 2019153853 A1 | | 8/2019 | |
| WO | WO-2020033381 A1 | * | 2/2020 | ........... H04W 24/08 |
| WO | WO-2021029081 A1 | * | 2/2021 | ............... H04L 1/08 |

OTHER PUBLICATIONS

3GPP TSG-RAN WG2 Meeting #102, R2-1808116, Addition of NR Support, Qualcomm Incorporated, Busan, Korea, May 21-25, 2018, total 32 pages.

Chinese Notice of Allowance issued in corresponding Chinese Application No. 201980100378.X, dated Apr. 28, 2023, pp. 1-4.

International Search Report issued in corresponding International Application No. PCT/CN2019/107525, dated Mar. 30, 2020, pp. 1-10.

Chinese Office Action issued in corresponding Chinese Application No. 201980100378.X, dated Jan. 20, 2023, pp. 1-6.

Extended European Search Report issued in corresponding European Application No. 19947107.9, dated Aug. 9, 2022, pp. 1-7.

* cited by examiner

DATA TRANSMISSION RESOURCE DETERMINING METHOD, DEVICE, AND SYSTEM

CROSS-REFERENCE TO RELATED APPLICATIONS

This application is a continuation of International Application No. PCT/CN2019/107525, filed on Sep. 24, 2019, the disclosure of which is hereby incorporated by reference in its entirety.

TECHNICAL FIELD

This application relates to the communications field, and in particular, to a data transmission resource determining method, a device, and a system.

BACKGROUND

In vehicle to everything (vehicle to everything, V2X) communication in a long term evolution (long term evolution, LTE) system, a single transport block (transmission block, TB) supports a maximum of two times of transmission, that is, one time of initial transmission and one time of retransmission. Whether the single TB is retransmitted is indicated by an $SF_{gap}$ field in sidelink control information (sidelink control information, SCI). If the field is 0, it indicates that only one time of initial transmission is performed on the TB, and no retransmission is performed on the TB. If the field is not 0, it indicates that a time domain interval between a moment for the first time of retransmission of the TB and a moment for the initial transmission of the TB is $SF_{gap}$, and a frequency resource of the first time of retransmission is the same as that of the initial transmission.

However, in V2X communication in a new radio (new radio, NR) system, a more complex scenario needs to be supported and higher reliability needs to be provided. Therefore, a quantity of times of retransmitting a single TB may be greater than 1. In the NR V2X communication, if a same time domain interval is configured for each time of retransmission according to a retransmission resource configuration method in LTE V2X, transmission flexibility is relatively low. In addition, if a time domain position is reconfigured for each time of retransmission, for example, a network device sends time domain position information of each time of retransmission to a terminal device, relatively high transmission overheads are caused. Therefore, how to configure a retransmission resource to reduce transmission overheads while improving transmission flexibility is an urgent problem to be solved at present.

SUMMARY

Embodiments of this application provide a data transmission resource determining method, a device, and a system, to reduce transmission overheads while improving transmission flexibility.

To achieve the foregoing objective, the following technical solutions are used in embodiments of this application.

According to a first aspect, a data transmission resource determining method and a corresponding communications apparatus are provided. In this solution, a first terminal device determines an initial time interval and an interval difference, and determines, based on the initial time interval and the interval difference, a time domain position of a first time-frequency resource used when a first TB is transmitted for the $i^{th}$ time. The initial time interval is a time interval between a time domain position at which the first TB is transmitted for the first time and a time domain position at which the first TB is transmitted for the second time, and the interval difference is a difference between a first time interval and a second time interval. The first time interval is a time interval between a time domain position at which the first TB is transmitted for the $k^{th}$ time and a time domain position at which the first TB is transmitted for the $(k+1)^{th}$ time, the second time interval is a time interval between a time domain position at which the first TB is transmitted for the $(k+1)^{th}$ time and a time domain position at which the first TB is transmitted for the $(k+2)^{th}$ time, k is a positive integer, $1 \leq k \leq R_{max}-1$, i is a positive integer, $2 \leq i \leq R_{max}+1$, $R_{max}$ represents a maximum quantity of retransmission times, $R_{max}$ is a positive integer greater than 1, and the interval difference is not 0.

Based on this solution, the first terminal device may determine, based on the initial time interval and the interval difference, a time domain position of a time-frequency resource used for any time of transmission when a quantity of transmission times is greater than 1. Because the interval difference is not 0, time domain intervals corresponding to all times of retransmission are different, and relative changes of time domain positions for all the times of retransmission are different, so that transmission flexibility can be improved. In addition, the first terminal device can determine, based on only the initial time interval and the interval difference, the time domain position of the time-frequency resource used for any time of transmission when the quantity of transmission times is greater than 1. Therefore, other information used to determine a retransmission time domain position does not need to be obtained, so that transmission overheads can be reduced.

In a possible design, the data transmission resource determining method further includes: The first terminal device sends the initial time interval and the interval difference to a second terminal device. Based on this solution, the second terminal device can determine a resource for repeatedly receiving the first TB. This avoids a problem that the first TB cannot be correctly received because the second terminal device does not determine a retransmission resource of the first TB, thereby improving transmission reliability of the first TB.

According to a second aspect, a data transmission resource determining method and a corresponding communications apparatus are provided. In this solution, a second terminal device obtains an initial time interval and an interval difference, and determines, based on the initial time interval and the interval difference, a time domain position of a first time-frequency resource used when a first TB is transmitted for the $i^{th}$ time. The initial time interval is a time interval between a time domain position at which the first TB is transmitted for the first time and a time domain position at which the first TB is transmitted for the second time, and the interval difference is a difference between a first time interval and a second time interval. The first time interval is a time interval between a time domain position at which the first TB is transmitted for the $k^{th}$ time and a time domain position at which the first TB is transmitted for the $(k+1)^{th}$ time, the second time interval is a time interval between a time domain position at which the first TB is transmitted for the $(k+1)^{th}$ time and a time domain position at which the first TB is transmitted for the $(k+2)^{th}$ time, k is a positive integer, $1 \leq k \leq R_{max}-1$, i is a positive integer, $2 \leq i \leq R_{max}+1$, $R_{max}$ represents a maximum quantity of retransmission times, $R_{max}$ is a positive integer greater than 1, and the interval difference is not 0. For a technical effect brought by the second aspect, refer to the technical effect brought by the first aspect. Details are not described herein again.

In a possible design, the data transmission resource determining method further includes: The second terminal device receives the initial time interval and the interval difference from a first terminal device.

With reference to the first aspect or the second aspect, in a possible design, the determining, based on the initial time interval and the interval difference, a time domain position of a first time-frequency resource used when the first TB is transmitted for the $i^{th}$ time includes: determining a target time interval based on the initial time interval and the interval difference, where the target time interval is a time interval between the time domain position at which the first TB is transmitted for the $i^{th}$ time and a time domain position at which the first TB is transmitted for the $(i-1)^{th}$ time; and determining the time domain position of the first time-frequency resource based on the target time interval and the time domain position at which the first TB is transmitted for the $(i-1)^{th}$ time.

With reference to the first aspect or the second aspect, in a possible design, the target time interval satisfies the following first relationship:

$$T_{i-1} = (i-2) * TD_{gap} + TI_{gap}.$$

Herein, $T_{i-1}$ is the target time interval, $TI_{gap}$ is the initial time interval, and $TD_{gap}$ is the interval difference.

With reference to the first aspect or the second aspect, in a possible design, the target time interval satisfies the following second relationship:

$$T_{i-1} = TI_{gap} - (i-2) * TD_{gap}.$$

Herein, $T_{i-1}$ is the target time interval, $TI_{gap}$ is the initial time interval, and $TD_{gap}$ is the interval difference.

With reference to the first aspect or the second aspect, in a possible design, the time domain position of the first time-frequency resource satisfies the following third relationship:

$$t_i^{SL} = (t_{i-1}^{SL} + T_{i-1}) \% t_{T_{MAX}}^{SL}.$$

Herein, $t_i^{SL}$ is the time domain position of the first time-frequency resource, $t_{i-1}^{SL}$ is the time domain position at which the first TB is transmitted for the $(i-1)^{th}$ time, $T_{i-1}$ is the target time interval, $t_{T_{MAX}}^{SL}$ is a maximum length of a time domain resource pool, and % represents a remainder operation.

With reference to the first aspect or the second aspect, in a possible design, the data transmission resource determining method further includes: determining a first start frequency domain position set based on a quantity of sub-channels used when the first TB is transmitted for the first time or a start sub-channel index used when the first TB is transmitted for the first time; determining, based on the first start frequency domain position set, a start frequency domain position of the first time-frequency resource used when the first TB is transmitted for the $i^{th}$ time; and determining a frequency domain position of the first time-frequency resource based on the start frequency domain position of the first time-frequency resource and the quantity of sub-channels used when the first TB is transmitted for the first time. A frequency domain resource pool includes a plurality of sub-channels, the first start frequency domain position set includes X sub-channel indices, X is a positive integer, and the start sub-channel index used when the first TB is transmitted for the first time is an index of the $1^{st}$ sub-channel used when the first TB is transmitted for the first time.

Based on this solution, the first terminal device and the second terminal device can determine the first start frequency domain position set based on a related parameter during the first time of transmission, and determine, based on the first start frequency domain position set, a frequency domain position of a time-frequency resource used for any time of transmission when a quantity of transmission times is greater than 1. Therefore, during two or more times of retransmission of the first TB, transmission overheads caused by configuring information about a time domain position can be reduced, and frequency domain positions for all times of retransmission are different. Therefore, transmission flexibility can be further improved.

With reference to the first aspect and the second aspect, in a possible design, the determining a first start frequency domain position set based on a quantity of sub-channels used when the first TB is transmitted for the first time includes: determining the first start frequency domain position set based on $L_{subCH}$, $N_{subCH}$, and $R_{max}$, where $L_{subCH}$ is the quantity of sub-channels used when the first TB is transmitted for the first time, and $N_{subCH}$ is a maximum quantity of sub-channels in the frequency domain resource pool.

With reference to the first aspect and the second aspect, in a possible design, the determining the first start frequency domain position set based on $L_{subCH}$, $N_{subCH}$, and $R_{max}$ includes: determining X+1 sub-channel indices based on $L_{subCH}$, $N_{subCH}$, and $R_{max}$, where the $(X+1)^{th}$ sub-channel index in the X+1 sub-channel indices is the same as the $1^{st}$ sub-channel index in the X+1 sub-channel indices, and first X sub-channel indices in the X+1 sub-channel indices are different from each other; and determining the first X sub-channel indices as sub-channel indices constituting the first start frequency domain position set. Based on this solution, the first start frequency domain position set may include different sub-channel indices, so that frequency domain positions for all times of transmission that are determined by the terminal device based on the first start frequency domain position set may be different, thereby further improving transmission flexibility.

With reference to the first aspect and the second aspect, in a possible design, the determining, based on the first start frequency domain position set, a start frequency domain position of the first time-frequency resource used when the first TB is transmitted for the $i^{th}$ time includes: if X is greater than or equal to i, determining, as the start frequency domain position of the first time-frequency resource, a sub-channel indicated by a sub-channel index that is in a second start frequency domain position set and that has a longest Euclidean distance from a start sub-channel index used when the first TB is transmitted for the $(i-1)^{th}$ time, and deleting, from the second start frequency domain position set, the sub-channel index corresponding to the start frequency domain position of the first time-frequency resource, where an initial set of the second start frequency domain position set includes a sub-channel index in the first start frequency domain position set other than the 1$^{st}$ sub-channel index in the first start frequency domain position set; or if X is less than i, determining, as the start frequency domain position of the first time-frequency resource, a sub-channel indicated by a sub-channel index that is in the n$^{th}$ third start frequency domain position set and that has a longest Euclidean distance from a start sub-channel index used when the first TB is transmitted for the (i−1)$^{th}$ time, and deleting, from the n$^{th}$ third start frequency domain position set, the sub-channel index corresponding to the start frequency domain position of the first time-frequency resource, where an initial set of the n$^{th}$ third start frequency domain position set is the same as the first start frequency domain position set, n=⌈i/X⌉−1, and ⌈ ⌉ represents a ceiling operation.

Based on this solution, because a Euclidean distance between a start frequency domain position for each time of retransmission and a start frequency domain position for a previous time of retransmission is the longest, a change between frequency domain positions for two consecutive times of retransmission is relatively large, so that a frequency diversity gain can be fully used, thereby improving transmission reliability.

With reference to the first aspect and the second aspect, in a possible design, the determining a first start frequency domain position set based on a start sub-channel index used when the first TB is transmitted for the first time includes: determining the first start frequency domain position set based on the start sub-channel index used when the first TB is transmitted for the first time and a first number sequence, where the first number sequence includes $N_{subCH}$ sub-channel indices, the $N_{subCH}$ sub-channel indices include the start sub-channel index used when the first TB is transmitted for the first time, the $N_{subCH}$ sub-channel indices are different from each other, and $N_{subCH}$ is a maximum quantity of sub-channels in the frequency domain resource pool.

With reference to the first aspect and the second aspect, in a possible design, the determining the first start frequency domain position set based on the start sub-channel index used when the first TB is transmitted for the first time and a first number sequence includes: converting the first number sequence into a second number sequence according to a preset rule; determining a first sub-channel index, where the first sub-channel index is a sub-channel index that is in the second number sequence and that corresponds to the start sub-channel index used when the first TB is transmitted for the first time; and determining the first start frequency domain position set based on the first sub-channel index and the second number sequence, where each sub-channel index in the first start frequency domain position set is less than or equal to a first value.

With reference to the first aspect and the second aspect, in a possible design, a value of X is $R_{max}$, and the determining the first start frequency domain position set based on the first sub-channel index and the second number sequence includes: if the first sub-channel index is less than or equal to the first value, determining the first sub-channel index as the 1$^{st}$ sub-channel index in the first start frequency domain position set; or if the first sub-channel index is greater than the first value, determining, as the 1$^{st}$ sub-channel index in the first start frequency domain position set, a next sub-channel index that is less than or equal to the first value and that is closest to the first sub-channel index in the second number sequence, where a next sub-channel index that is in the second number sequence and that is closest to the last sub-channel index in the second number sequence is the 1$^{st}$ sub-channel index in the second number sequence; and determining, as the (m+1)$^{th}$ sub-channel index in the first start frequency domain position set, a next sub-channel index that is in the second number sequence, that is closest to the m$^{th}$ sub-channel index in the first start frequency domain position set, and that is less than or equal to the first value, where m is a positive integer ranging from 1 to X−1.

With reference to the first aspect and the second aspect, in a possible design, the determining, based on the first start frequency domain position set, a start frequency domain position of the first time-frequency resource used when the first TB is transmitted for the i$^{th}$ time includes: determining, as the start frequency domain position of the first time-frequency resource, a sub-channel indicated by the (i−1)$^{th}$ sub-channel index in the first start frequency domain position set.

According to a third aspect, a data transmission resource determining method and a corresponding communications apparatus are provided. In this solution, a first terminal device determines a first start frequency domain position set based on a quantity of sub-channels used when a first TB is transmitted for the first time or a start sub-channel index used when the first TB is transmitted for the first time; determines, based on the first start frequency domain position set, a start frequency domain position of a first time-frequency resource used when the first TB is transmitted for the i$^{th}$ time; and determines a frequency domain position of the first time-frequency resource based on the start frequency domain position of the first time-frequency resource and the quantity of sub-channels used when the first TB is transmitted for the first time. A frequency domain resource pool includes a plurality of sub-channels, the first start frequency domain position set includes X sub-channel indices, X is a positive integer, the start sub-channel index used when the first TB is transmitted for the first time is an index of the 1$^{st}$ sub-channel used when the first TB is transmitted for the first time, i is a positive integer, 2≤i≤$R_{max}$+1, $R_{max}$ represents a maximum quantity of retransmission times, and $R_{max}$ is a positive integer greater than 1.

Based on this solution, the first terminal device and a second terminal device can determine the first start frequency domain position set based on a related parameter during the first time of transmission, and determine, based on the first start frequency domain position set, a frequency domain position of a time-frequency resource used for any time of transmission when a quantity of transmission times is greater than 1. Therefore, during two or more times of retransmission of the first TB, transmission overheads caused by configuring information about a frequency domain position can be reduced, and frequency domain positions for all times of retransmission are different. Therefore, transmission flexibility can be further improved.

According to a fourth aspect, a data transmission resource determining method and a corresponding communications apparatus are provided. In this solution, a second terminal device determines a first start frequency domain position set based on a quantity of sub-channels used when a first TB is transmitted for the first time or a start sub-channel index used when the first TB is transmitted for the first time; determines, based on the first start frequency domain position set, a start frequency domain position of a first time-frequency resource used when the first TB is transmitted for the i$^{th}$ time; and determines a frequency domain position of the first time-frequency resource based on the start frequency domain position of the first time-frequency resource and the quantity of sub-channels used when the first TB is transmitted for the first time. A frequency domain resource pool includes a plurality of sub-channels, the first start frequency domain position set includes X sub-channel indices, X is a positive integer, the start sub-channel index used when the first TB is transmitted for the first time is an index of the $1^{st}$ sub-channel used when the first TB is transmitted for the first time, i is a positive integer, $2 \leq i \leq R_{max}+1$, $R_{max}$ represents a maximum quantity of retransmission times, and $R_{max}$ is a positive integer greater than 1. For a technical effect brought by the fourth aspect, refer to the technical effect brought by the third aspect. Details are not described herein again.

With reference to the third aspect and the fourth aspect, in a possible design, the determining a first start frequency domain position set based on a quantity of sub-channels used when a first TB is transmitted for the first time includes: determining the first start frequency domain position set based on $L_{subCH}$, $N_{subCH}$, and $R_{max}$, where $L_{subCH}$ is the quantity of sub-channels used when the first TB is transmitted for the first time, and $N_{subCH}$ is a maximum quantity of sub-channels in the frequency domain resource pool.

With reference to the third aspect and the fourth aspect, in a possible design, the determining the first start frequency domain position set based on $L_{subCH}$, $N_{subCH}$, and $R_{max}$ includes: determining X+1 sub-channel indices based on $L_{subCH}$, $N_{subCH}$, and $R_{max}$, and determining first X sub-channel indices as sub-channel indices constituting the first start frequency domain position set. The $(X+1)^{th}$ sub-channel index in the X+1 sub-channel indices is the same as the $1^{st}$ sub-channel index in the X+1 sub-channel indices, and the first X sub-channel indices in the X+1 sub-channel indices are different from each other. Based on this solution, the first start frequency domain position set may include different sub-channel indices, so that frequency domain positions for all times of transmission that are determined by the terminal device based on the first start frequency domain position set may be different, thereby further improving transmission flexibility.

With reference to the third aspect and the fourth aspect, in a possible design, the determining, based on the first start frequency domain position set, a start frequency domain position of a first time-frequency resource used when the first TB is transmitted for the $i^{th}$ time includes: if X is greater than or equal to i, determining, as the start frequency domain position of the first time-frequency resource, a sub-channel indicated by a sub-channel index that is in a second start frequency domain position set and that has a longest Euclidean distance from a start sub-channel index used when the first TB is transmitted for the $(i-1)^{th}$ time, and deleting, from the second start frequency domain position set, the sub-channel index corresponding to the start frequency domain position of the first time-frequency resource, where an initial set of the second start frequency domain position set includes a sub-channel index in the first start frequency domain position set other than the $1^{st}$ sub-channel index in the first start frequency domain position set; or if X is less than i, determining, as the start frequency domain position of the first time-frequency resource, a sub-channel indicated by a sub-channel index that is in the $n^{th}$ third start frequency domain position set and that has a longest Euclidean distance from a start sub-channel index used when the first TB is transmitted for the $(i-1)^{th}$ time, and deleting, from the $n^{th}$ third start frequency domain position set, the sub-channel index corresponding to the start frequency domain position of the first time-frequency resource, where an initial set of the $n^{th}$ third start frequency domain position set is the same as the first start frequency domain position set, $n=\lceil i/X \rceil - 1$, and $\lceil\ \rceil$ represents a ceiling operation.

Based on this solution, because a Euclidean distance between a start frequency domain position for each time of retransmission and a start frequency domain position for a previous time of retransmission is the longest, a change between frequency domain positions for two consecutive times of retransmission is relatively large, so that a frequency diversity gain can be fully used, thereby improving transmission reliability.

With reference to the third aspect and the fourth aspect, in a possible design, the determining a first start frequency domain position set based on a start sub-channel index used when the first TB is transmitted for the first time includes: determining the first start frequency domain position set based on the start sub-channel index used when the first TB is transmitted for the first time and a first number sequence, where the first number sequence includes $N_{subCH}$ sub-channel indices, the $N_{subCH}$ sub-channel indices include the start sub-channel index used when the first TB is transmitted for the first time, the $N_{subCH}$ sub-channel indices are different from each other, and $N_{subCH}$ is a maximum quantity of sub-channels in the frequency domain resource pool.

With reference to the third aspect and the fourth aspect, in a possible design, the determining the first start frequency domain position set based on the start sub-channel index used when the first TB is transmitted for the first time and a first number sequence includes: converting the first number sequence into a second number sequence according to a preset rule; determining a first sub-channel index; and determining the first start frequency domain position set based on the first sub-channel index and the second number sequence. The first sub-channel index is a sub-channel index that is in the second number sequence and that corresponds to the start sub-channel index used when the first TB is transmitted for the first time, and each sub-channel index in the first start frequency domain position set is less than or equal to a first value.

With reference to the third aspect and the fourth aspect, in a possible design, a value of X is $R_{max}$, and the determining the first start frequency domain position set based on the first sub-channel index and the second number sequence includes: if the first sub-channel index is less than or equal to the first value, determining the first sub-channel index as the $1^{st}$ sub-channel index in the first start frequency domain position set; or if the first sub-channel index is greater than the first value, determining, as the $1^{st}$ sub-channel index in the first start frequency domain position set, a next sub-channel index that is less than or equal to the first value and that is closest to the first sub-channel index in the second number sequence, where a next sub-channel index that is in the second number sequence and that is closest to the last sub-channel index in the second number sequence is the $1^{st}$ sub-channel index in the second number sequence; and determining, as the $(m+1)^{th}$ sub-channel index in the first start frequency domain position set, a next sub-channel index that is in the second number sequence, that is closest to the $m^{th}$ sub-channel index in the first start frequency domain position set, and that is less than or equal to the first value, where m is a positive integer ranging from 1 to X−1.

With reference to the third aspect or the fourth aspect, in a possible design, the determining, based on the first start frequency domain position set, a start frequency domain position of the first time-frequency resource used when the first TB is transmitted for the $i^{th}$ time includes: determining, as the start frequency domain position of the first time-frequency resource, a sub-channel indicated by the $(i-1)^{th}$ sub-channel index in the first start frequency domain position set.

According to a fifth aspect, a communications apparatus is provided to implement the foregoing methods. The communications apparatus may be the first terminal device in the first aspect or the third aspect, an apparatus including the first terminal device, or an apparatus such as a chip included in the first terminal device. Alternatively, the communications apparatus may be the second terminal device in the second aspect or the fourth aspect, an apparatus including the second terminal device, or an apparatus included in the second terminal device. The communications apparatus includes a corresponding module, unit, or means (means) for implementing the foregoing method. The module, unit, or means may be implemented by hardware, software, or hardware executing corresponding software. The hardware or the software includes one or more modules or units corresponding to the foregoing functions.

According to a sixth aspect, a communications apparatus is provided, including a processor and a memory, where the memory is configured to store computer instructions. When the processor executes the instructions, the communications apparatus performs the method in any one of the foregoing aspects. The communications apparatus may be the first terminal device in the first aspect or the third aspect, an apparatus including the first terminal device, or an apparatus such as a chip included in the first terminal device. Alternatively, the communications apparatus may be the second terminal device in the second aspect or the fourth aspect, an apparatus including the second terminal device, or an apparatus included in the second terminal device.

According to a seventh aspect, a communications apparatus is provided, including a processor and an interface circuit. The interface circuit may be a code/data read/write interface circuit, and the interface circuit is configured to receive computer-executable instructions (the computer-executable instructions are stored in a memory, and may be read from the memory directly or through another component) and transmit the computer-executable instructions to the processor. The processor is configured to run the computer-executable instructions to perform the method in any one of the foregoing aspects. The communications apparatus may be the first terminal device in the first aspect or the third aspect, an apparatus including the first terminal device, or an apparatus such as a chip included in the first terminal device. Alternatively, the communications apparatus may be the second terminal device in the second aspect or the fourth aspect, an apparatus including the second terminal device, or an apparatus included in the second terminal device.

According to an eighth aspect, a communications apparatus is provided, including a processor. The processor is configured to: be coupled to a memory, and after reading instructions in the memory, perform the method in any one of the foregoing aspects based on the instructions. The communications apparatus may be the first terminal device in the first aspect or the third aspect, an apparatus including the first terminal device, or an apparatus such as a chip included in the first terminal device. Alternatively, the communications apparatus may be the second terminal device in the second aspect or the fourth aspect, an apparatus including the second terminal device, or an apparatus included in the second terminal device.

According to a ninth aspect, a computer-readable storage medium is provided. The computer-readable storage medium stores instructions, and when the instructions are run on a communications apparatus, the communications apparatus is enabled to perform the method in any one of the foregoing aspects. The communications apparatus may be the first terminal device in the first aspect or the third aspect, an apparatus including the first terminal device, or an apparatus such as a chip included in the first terminal device. Alternatively, the communications apparatus may be the second terminal device in the second aspect or the fourth aspect, an apparatus including the second terminal device, or an apparatus included in the second terminal device.

According to a tenth aspect, a computer program product including instructions is provided. When the computer program product runs on a communications apparatus, the communications apparatus is enabled to perform the method in any one of the foregoing aspects. The communications apparatus may be the first terminal device in the first aspect or the third aspect, an apparatus including the first terminal device, or an apparatus such as a chip included in the first terminal device. Alternatively, the communications apparatus may be the second terminal device in the second aspect or the fourth aspect, an apparatus including the second terminal device, or an apparatus included in the second terminal device.

According to an eleventh aspect, a communications apparatus (for example, the communications apparatus may be a chip or a chip system) is provided. The communications apparatus includes a processor, configured to implement a function in any one of the foregoing aspects. In a possible design, the communications apparatus further includes a memory, and the memory is configured to store necessary program instructions and data. When the communications apparatus is a chip system, the chip system may include a chip, or include a chip and another discrete component.

For technical effects brought by any one of design manners in the fifth aspect to the eleventh aspect, refer to technical effects brought by different design manners of the first aspect, the second aspect, the third aspect, or the fourth aspect. Details are not described herein again.

According to a twelfth aspect, a communications system is provided. The communications system includes the first terminal device in the foregoing aspects and the second terminal device in the foregoing aspects.

DESCRIPTION OF EMBODIMENTS

Figure 1:
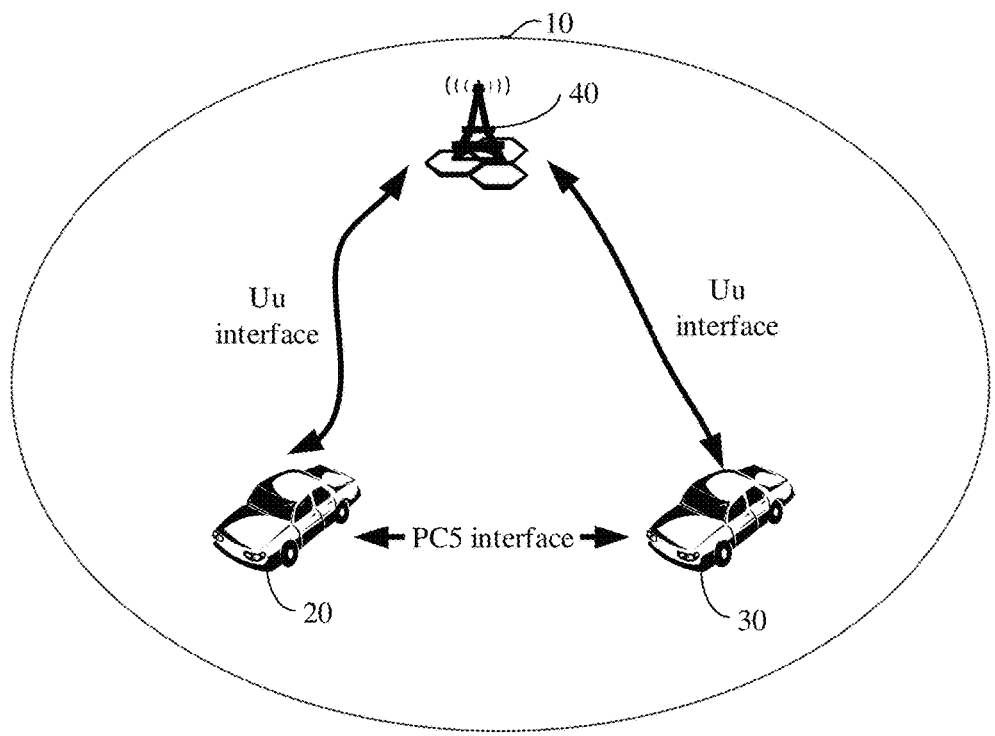
FIG. 1 is a schematic diagram of a structure of a communications system according to an embodiment of this application.

The following describes the technical solutions in embodiments of this application with reference to the accompanying drawings in embodiments of this application. In the descriptions of this application, "/" represents an "or" relationship between associated objects unless otherwise specified. For example, A/B may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, in the descriptions of this application, unless otherwise specified, "at least one" means one or more, and "a plurality of" means two or more. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference.

The technical solutions in embodiments of this application may be applied to various communications systems, for example, a 5th generation (5th generation, 5G) communications system and another system. Terms "system" and "network" may be interchanged with each other. A 5G communications system is a next-generation communications system under research. The 5G communications system includes a 5G non-standalone (non-standalone, NSA) mobile communications system, a 5G standalone (stand-alone, SA) mobile communications system, or both a 5G NSA mobile communications system and a 5G SA mobile communications system. In addition, the communications systems may be further applied to a future-oriented communications technology, and are all applicable to the technical solutions provided in embodiments of this application. The foregoing communications systems applicable to this application are merely examples for description, and communications systems applicable to this application are not limited thereto. A general description is provided herein, and details are not described below.

In addition, the technical solutions provided in embodiments of this application may be applied to a cellular link, or may be applied to a link between devices, for example, a device to device (device to device, D2D) link. The D2D link or a V2X link may also be referred to as a sidelink, a secondary link, a sidelink, or the like. In embodiments of this application, the foregoing terms all refer to links established between devices of a same type, and have a same meaning. The link established between devices of a same type may be a link between terminal devices, a link between base stations, a link between relay nodes, or the like. This is not limited in embodiments of this application. For the link between the terminal devices, there is a D2D link defined in 3GPP Release (Rel)-12/13, and there is also a V2X link, defined by 3GPP for the internet of vehicles, between vehicles, a vehicle and a mobile phone, or a vehicle and any entity. The V2X link includes a V2X link in Rel-14/15, and further includes, for example, an NR-system-based V2X link in Rel-16 and subsequent releases which are currently being researched by 3GPP.

FIG. 1 shows a communications system 10 according to an embodiment of this application. The communications system 10 includes a first terminal device 20 and a second terminal device 30. The first terminal device 20 may directly communicate with the second terminal device 30 through a PC5 interface, and a direct communication link between the first terminal device 20 and the second terminal device 30 is a sidelink (sidelink, SL).

Optionally, the communications system 10 may further include a network device 40, which can provide timing synchronization and resource scheduling for a terminal device. The network device 40 may communicate with at least one terminal device (such as the first terminal device 20) through a Uu interface. A communication link between the network device 40 and the terminal device includes an uplink (uplink, UL) and a downlink (downlink, DL). Indirect communication may be further implemented between the first terminal device 20 and the second terminal device 30 through forwarding of the network device 40. For example, the first terminal device 20 may send data to the network device 40 through the Uu interface, and after the network device 40 sends the data to an application server (not shown in FIG. 1) for processing, the application server delivers processed data to the network device 40, and the network device 40 sends the processed data to the second terminal device 30. In a Uu interface-based communication manner, a network device that forwards uplink data from the first terminal device 20 to the application server and a network device that forwards downlink data delivered by the application server to the second terminal device 30 may be a same network device, or may be different network devices. This may be determined by the application server.

Based on the foregoing two communication manners, the first terminal device 20 may send some information about the first terminal device 20 to the second terminal device 30 or another surrounding terminal device. The information may include information that needs to be periodically sent, such as a position, a speed, and an intention, and some information whose sending is triggered by an aperiodic event. In addition, the first terminal device 20 may further receive information from another surrounding vehicle user in real time.

Communication between the first terminal device and the second terminal device shown in FIG. 1 is used as an example. In embodiments of this application, the first terminal device and the second terminal device may determine an initial time interval and an interval difference, and determine, based on the initial time interval and the interval difference, a time domain position of a first time-frequency resource used when a first TB is transmitted for the $i^{th}$ time. The initial time interval is a time interval between a time domain position at which the first TB is transmitted for the first time and a time domain position at which the first TB is transmitted for the second time, and the interval difference is a difference between a first time interval and a second time interval. The first time interval is a time interval between a time domain position at which the first TB is transmitted for the $k^{th}$ time and a time domain position at which the first TB is transmitted for the $(k+1)^{th}$ time, the second time interval is a time interval between a time domain position at which the first TB is transmitted for the $(k+1)^{th}$ time and a time domain position at which the first TB is transmitted for the $(k+2)^{th}$ time, k is a positive integer, $1 \leq k \leq R_{max}-1$, i is a positive integer, $2 \leq i \leq R_{max}+1$, $R_{max}$ represents a maximum quantity of retransmission times, $R_{max}$ is a positive integer greater than 1, and the interval difference is not 0.

Based on this solution, the first terminal device may determine, based on the initial time interval and the interval difference, a time domain position of a time-frequency resource used for any time of transmission when a quantity of transmission times is greater than 1. Because the interval difference is not 0, time domain intervals corresponding to all times of retransmission are different, and relative changes of time domain positions for all the times of retransmission are different, so that transmission flexibility can be improved. In addition, the first terminal device can determine, based on only the initial time interval and the interval difference, the time domain position of the time-frequency resource used for any time of transmission when the quantity of transmission times is greater than 1. Therefore, other information used to determine a retransmission time domain position does not need to be obtained, so that transmission overheads can be reduced.

Alternatively, communication between the first terminal device and the second terminal device shown in FIG. 1 is used as an example. In embodiments of this application, the first terminal device and the second terminal device may determine a first start frequency domain position set based on a quantity of sub-channels used when a first TB is transmitted for the first time or a start sub-channel index used when the first TB is transmitted for the first time; determine, based on the first start frequency domain position set, a start frequency domain position of a first time-frequency resource used when the first TB is transmitted for the $i^{th}$ time; and then determine a frequency domain position of the first time-frequency resource based on the start frequency domain position of the first time-frequency resource and the quantity of sub-channels used when the first TB is transmitted for the first time. A frequency domain resource pool includes a plurality of sub-channels, the first start frequency domain position set includes X sub-channel indices, X is a positive integer, the start sub-channel index used when the first TB is transmitted for the first time is an index of the $1^{st}$ sub-channel used when the first TB is transmitted for the first time, i is a positive integer, $2 \leq i \leq R_{max}+1$, $R_{max}$ represents a maximum quantity of retransmission times, and $R_{max}$ is a positive integer greater than 1.

Based on this solution, the first terminal device and the second terminal device can determine the first start frequency domain position set based on a related parameter during the first time of transmission, and determine, based on the first start frequency domain position set, a frequency domain position of a time-frequency resource used for any time of transmission when a quantity of transmission times is greater than 1. Therefore, during two or more times of retransmission of the first TB, transmission overheads caused by configuring information about a frequency domain position can be reduced, and frequency domain positions for all times of retransmission are different. Therefore, transmission flexibility can be further improved.

Optionally, the network device 20 in embodiments of this application is a device that allows a terminal device to access a wireless network. The network device may be a node in a radio access network, and may also be referred to as a base station, or may be referred to as a radio access network (radio access network, RAN) node (or device). For example, the network device may include an evolved NodeB (NodeB or eNB or e-NodeB, evolutional Node B) in a long term evolution (long term evolution, LTE) system or an LTE-advanced (LTE-Advanced, LTE-A) system, for example, a conventional macro base station eNB and a micro base station eNB in a heterogeneous network scenario; or may include a next generation NodeB (next generation node B, gNB) in a 5G new radio (new radio, NR) system; or may include a transmission reception point (transmission reception point, TRP), a home base station (for example, home evolved NodeB, or home Node B, HNB), a baseband unit (base band unit, BBU), a baseband unit pool BBU pool, a Wi-Fi access point (access point, AP), or the like; or may include a centralized unit (centralized unit, CU) and a distributed unit (distributed unit, DU) in a cloud radio access network (cloud radio access network, CloudRAN) system. This is not limited in embodiments of this application. For another example, a network device in a V2X technology is a road side unit (road side unit, RSU). The RSU may be a fixed infrastructure entity supporting a V2X application, and may exchange a message with another entity supporting the V2X application.

Optionally, the terminal device (including the first terminal device and the second terminal device) in embodiments of this application is a device configured to implement a wireless communication function, such as a terminal or a chip that can be used in the terminal. The terminal may be user equipment (user equipment, UE), an access terminal, a terminal unit, a terminal station, a mobile station, a mobile station, a remote station, a remote terminal, a mobile device, a wireless communication device, a terminal agent, a terminal apparatus, or the like in a 5G network or a future evolved PLMN. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a virtual reality (virtual reality, VR) terminal device, an augmented reality (augmented reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like. The terminal may be movable or fixed. The terminal device in embodiments of this application may alternatively be a built-in vehicle-mounted module, vehicle-mounted module, vehicle-mounted component, vehicle-mounted chip, or vehicle-mounted unit with which a vehicle is equipped and that is used as one or more components or units. The vehicle may use the built-in vehicle-mounted module, vehicle-mounted module, vehicle-mounted component, vehicle-mounted chip, or vehicle-mounted unit to implement the method in this application.

Optionally, the network device 20 and the terminal device (including the first terminal device and the second terminal device) in embodiments of this application each may also be referred to as a communications apparatus, and may be a general-purpose device or a dedicated device. This is not specifically limited in embodiments of this application.

Figure 2:
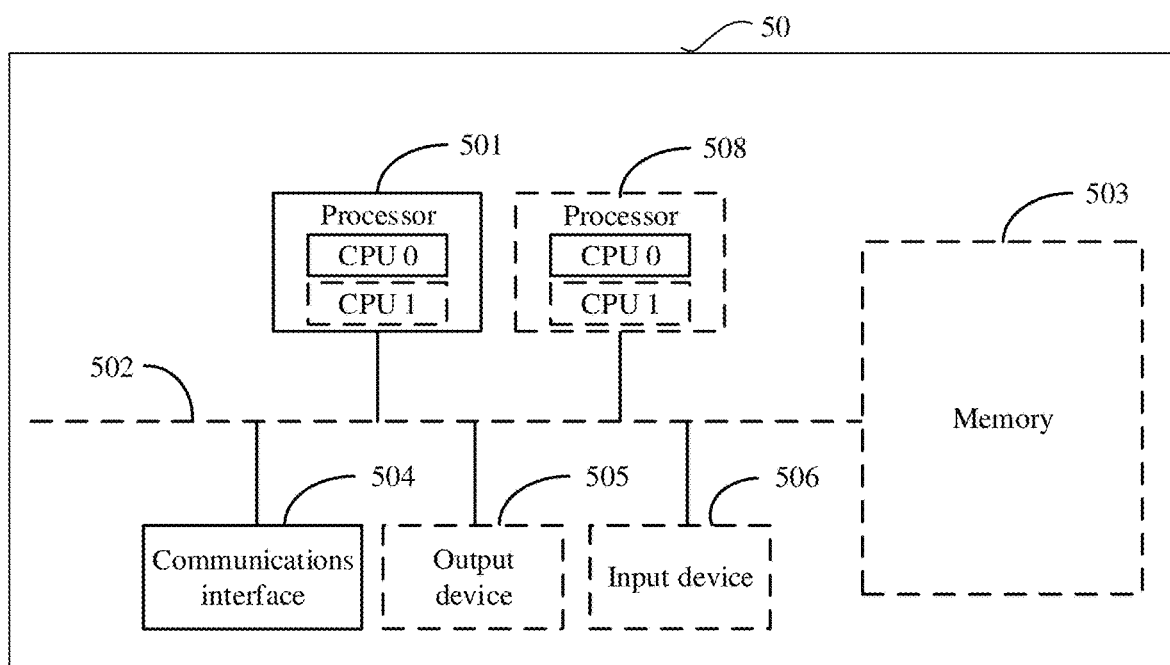
FIG. 2 is a schematic diagram of a structure of a communications apparatus according to an embodiment of this application.

Optionally, in embodiments of this application, the first terminal device 20, the second terminal device 30, or the network device 40 in FIG. 1 may be implemented by using a communications device (or a communications apparatus) 50 in FIG. 2. FIG. 2 is a schematic diagram of a structure of the communications device 50 according to an embodiment of this application. The communications device 50 includes one or more processors 501 and at least one communications interface (only an example in which a communications interface 504 and a processor 501 are included is used for description in FIG. 2). Optionally, the communications device 50 may further include a memory 503. Optionally, the communications device 50 may further include a communications bus 502.

Optionally, the processor 501, the communications interface 504, and the memory 503 may be coupled together (not shown in FIG. 2), or may be connected together by using the communications bus 502, as shown in FIG. 2.

The processor 501 may be a general central processing unit (central processing unit, CPU), a microprocessor, an application-specific integrated circuit (application-specific integrated circuit, ASIC), or one or more integrated circuits configured to control program execution of the solutions of this application.

The communications bus 502 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick dashed line is used to represent the bus in FIG. 2, but this does not mean that there is only one bus or only one type of bus. The communications bus 502 may be configured to connect different components in the communications device 50, so that the different components can communicate with each other.

The communications interface 504 may be a transceiver module, configured to communicate with another device or a communications network, for example, an Ethernet, a radio access network (radio access network, RAN), or a wireless local area network (wireless local area network, WLAN). For example, the transceiver module may be an apparatus such as a transceiver or a transceiver. Optionally, the communications interface 504 may alternatively be a transceiver circuit located inside the processor 501, and is configured to implement signal input and signal output of the processor.

The memory 503 may be an apparatus having a storage function. For example, the memory 503 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compressed optical disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer, but is not limited thereto. The memory may exist independently, and is connected to the processor by using the communications line 502. The memory may alternatively be integrated with the processor.

The memory 503 is configured to store computer-executable instructions for executing the solutions in this application, and execution is controlled by the processor 501. The processor 501 is configured to execute the computer-executable instruction stored in the memory 503, to implement a data transmission resource determining method provided in embodiments of this application.

Alternatively, optionally, in this embodiment of this application, the processor 501 may perform related processing functions in the data transmission resource determining method provided in the following embodiment of this application. The communications interface 504 is responsible for communicating with another device or a communications network. This is not specifically limited in this embodiment of this application.

Optionally, the computer-executable instructions in this embodiment of this application may also be referred to as application program code. This is not specifically limited in this embodiment of this application.

In a specific implementation, in an embodiment, the processor 501 may include one or more CPUs, such as a CPU 0 and a CPU 1 in FIG. 2.

In specific implementation, in an embodiment, the communications device 50 may include a plurality of processors, for example, the processor 501 and a processor 508 in FIG. 2. Each of the processors may be a single-core (single-CPU) processor or a multi-core (multi-CPU) processor. The processor herein may refer to one or more devices, circuits, and/or processing cores configured to process data (for example, computer program instructions).

In specific implementation, in an embodiment, the communications device 50 may further include an output device 505 and an input device 506. The output device 505 communicates with the processor 501, and may display information in a plurality of manners. For example, the output device 505 may be a liquid crystal display (liquid crystal display, LCD), a light emitting diode (light emitting diode, LED) display device, a cathode ray tube (cathode ray tube, CRT) display device, or a projector (projector). The input device 506 communicates with the processor 501, and may receive user input in a plurality of manners. For example, the input device 506 may be a mouse, a keyboard, a touchscreen device, or a sensing device.

Figure 3:
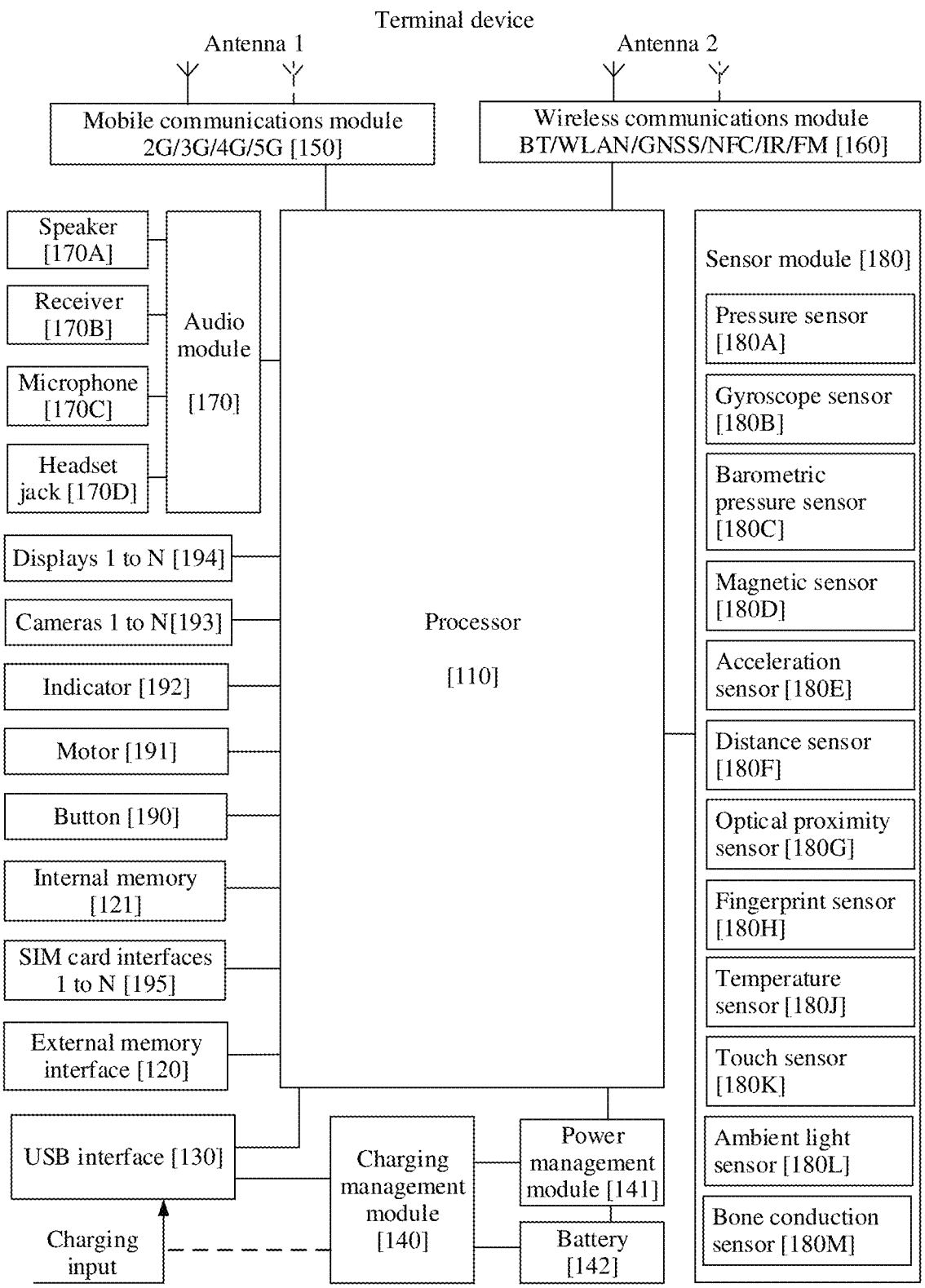
FIG. 3 is a schematic diagram of a structure of a terminal device according to an embodiment of this application.

With reference to the schematic diagram of the structure of the communications device 50 shown in FIG. 2, for example, FIG. 3 shows a specific structural form of a terminal device (including the first terminal device and the second terminal device) according to an embodiment of this application.

In some embodiments, a function of the processor 501 in FIG. 2 may be implemented by a processor 110 in FIG. 3.

In some embodiments, a function of the communications interface 504 in FIG. 2 may be implemented by using an antenna 1, an antenna 2, a mobile communications module 150, a wireless communications module 160, and the like in FIG. 3.

The antenna 1 and the antenna 2 are configured to transmit and receive electromagnetic wave signals. Each antenna in the terminal device may be configured to cover one or more communications frequency bands. Different antennas may be multiplexed to improve antenna utilization. For example, the antenna 1 may be multiplexed as a diversity antenna in a wireless local area network. In some other embodiments, the antenna may be used in combination with a tuning switch.

The mobile communications module 150 may provide a solution that is applied to the terminal device and that includes wireless communication such as 4G. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to a modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same component.

The wireless communications module 160 may provide a solution that is applied to the terminal device and that includes wireless communication such as a wireless local area network (wireless local area network, WLAN) (for example, a Wi-Fi network), Bluetooth (bluetooth, BT), a global navigation satellite system (global navigation satellite system, GNSS), frequency modulation (frequency modulation, FM), near field communication (near field communication, NFC), and infrared (infrared, IR). The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2. When the terminal device is a first device, that the wireless communications module 160 may provide a solution that is applied to the terminal device and that includes NFC wireless communication means that the first device includes an NFC chip. The NFC chip may improve an NFC wireless communication function. When the terminal device is a second device, that the wireless communications module 160 may provide a solution that is applied to the terminal device and that includes NFC wireless communication means that the first device includes an electronic label (for example, a radio frequency identification (radio frequency identification, RFID) label). If an NFC chip of another device is close to the electronic label, the another device may perform NFC wireless communication with the second device.

In some embodiments, the antenna 1 of the terminal device is coupled to the mobile communications module 150, and the antenna 2 is coupled to the wireless communications module 160, so that the terminal device may communicate with a network and other devices by using a wireless communications technology. The wireless communications technology may include long term evolution (long term evolution, LTE), BT, a GNSS, a WLAN, NFC, FM, an IR technology, or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), or a satellite based augmentation system (satellite based augmentation system, SBAS).

In some embodiments, a function of the memory 503 in FIG. 2 may be implemented by an internal memory 121, an external memory (for example, a micro SD card) connected to an external memory interface 120 in FIG. 3, or the like.

In some embodiments, a function of the output device 505 in FIG. 2 may be implemented by a display 194 in FIG. 3. The display 194 is configured to display an image, a video, and the like. The display 194 includes a display panel.

In some embodiments, a function of the input device 506 in FIG. 2 may be implemented by a mouse, a keyboard, a touchscreen device, or a sensor module 180 in FIG. 3. For example, as shown in FIG. 3, the sensor module 180 may include one or more of a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, and a bone conduction sensor 180M. This is not specifically limited in this embodiment of this application.

In some embodiments, as shown in FIG. 3, the terminal device may further include one or more of an audio module 170, a camera 193, an indicator 192, a motor 191, a button 190, a SIM card interface 195, a USB port 130, a charging management module 150, a power management module 141, and a battery 142. The audio module 170 may be connected to a speaker 170A (which is also referred to as a "loudspeaker"), a receiver 170B (which is also referred to as an "earpiece"), a microphone 170C (which is also referred to as a "mike" or a "mic"), a headset jack 170D, or the like. This is not specifically limited in this embodiment of this application.

It may be understood that the structure shown in FIG. 3 constitute no specific limitation on the terminal device. For example, in some other embodiments of this application, the terminal device may include more or fewer components than those shown in the figure, some components may be combined, some components may be split, or the components may be differently arranged. The components shown in the figure may be implemented by hardware, software, or a combination of software and hardware.

With reference to the accompanying drawings, the following describes in detail the data transmission resource determining method in embodiments of this application by using an example in which the first terminal device 20 and the second terminal device 30 shown in FIG. 1 interact with each other, the first terminal device serves as a transmit end of a first transport block (transmission block, TB), and the second terminal device serves as a receive end of the first TB.

It should be noted that names of messages between network elements, names of parameters in the messages, or the like in the following embodiments of this application are merely examples, and there may be other names in a specific implementation. This is not specifically limited in embodiments of this application.

Figure 4:
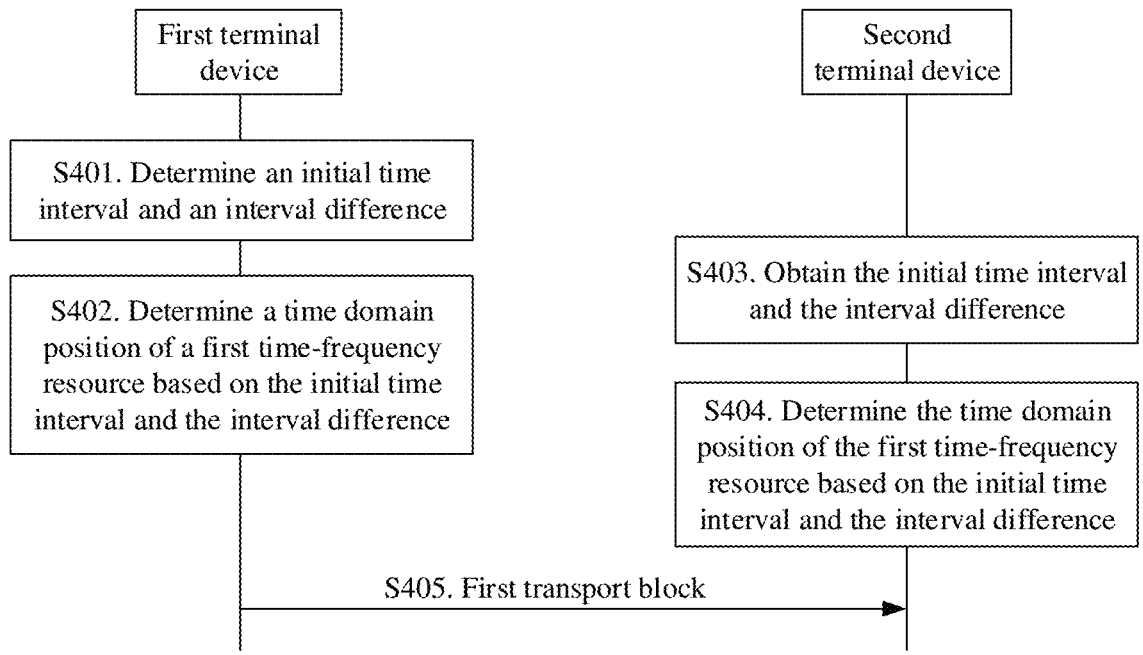
FIG. 4 is a schematic flowchart of a data transmission resource determining method according to an embodiment of this application.

FIG. 4 shows a data transmission resource determining method according to an embodiment of this application. The data transmission resource determining method includes the following steps.

S401. A first terminal device determines an initial time interval and an interval difference.

The initial time interval is a time interval between a time domain position at which a first TB is transmitted for the first time and a time domain position at which the first TB is transmitted for the second time, and the interval difference is a difference between a first time interval and a second time interval. The first time interval is a time interval between a time domain position at which the first TB is transmitted for the $k^{th}$ time and a time domain position at which the first TB is transmitted for the $(k+1)^{th}$ time, and the second time interval is a time interval between a time domain position at which the first TB is transmitted for the $(k+1)^{th}$ time and a time domain position at which the first TB is transmitted for the $(k+2)^{th}$ time. The interval difference is not 0, k is a positive integer greater than or equal to 1 and less than or equal to $R_{max}-1$, $R_{max}$ represents a maximum quantity of retransmission times of the first TB, and $R_{max}$ is a positive integer greater than 1.

It should be noted that in embodiments of this application, the first time of transmission of the first TB may be understood as initial transmission of the first TB, the second time of transmission of the first TB may be understood as the first time of retransmission of the first TB, and by analogy. A time domain position for transmitting the first TB may also be understood as a start moment of the time domain position for transmitting the first TB. A time interval may be measured by a time unit, and each time unit may be one slot or symbol. Unified descriptions are provided herein, and are not provided in the following embodiments.

Figure 5:
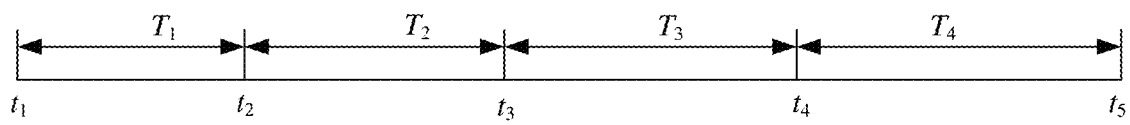
FIG. 5 is a schematic diagram of an initial time interval and an interval difference according to an embodiment of this application.

For example, the maximum quantity $R_{max}$ of retransmission times is 4. As shown in FIG. 5, $t_1$ is the time domain position at which the first TB is transmitted for the first time, and $t_2$, $t_3$, $t_4$, and $t_5$ are respectively time domain positions at which the first TB is transmitted for the second time, the third time, the fourth time, and the fifth time. When k is 1, the first time interval is a time interval $T_1$ between $t_1$ and $t_2$, and the second time interval is a time interval $T_2$ between $t_2$ and $t_3$. In this case, the interval difference is $T_2-T_1$ or $T_1-T_2$. By analogy, when k is $R_{max}-1$, that is, 3, the first time interval is a time interval $T_3$ between $t_3$ and $t_4$, and the second time interval is a time interval $T_4$ between $t_4$ and $t_5$. In this case, the interval difference is $T_4-T_5$ or $T_3-T_4$.

Optionally, the maximum quantity $R_{max}$ of retransmission times of the first TB may be configured by a network device, or may be determined by the first terminal device. This is not specifically limited in embodiments of this application.

Optionally, the first terminal device may determine the initial time interval and the interval difference in a plurality of manners.

In a possible implementation, the initial time interval and the interval difference may be configured by the network device for the first terminal device. For example, the network device may send downlink control information (downlink control information, DCI) to the first terminal device, and indicate the initial time interval and the interval difference in the DCI. The network device may separately indicate the initial time interval and the interval difference by using two fields in the DCI, or may indicate the initial time interval and the interval difference by using two parts of a same field. This is not specifically limited in embodiments of this application.

In another possible implementation, the initial time interval and the interval difference may be determined by the first terminal device. For example, the first terminal device may determine the initial time interval and the interval difference based on a quality of service (quality of service, QoS) requirement of the first TB.

Optionally, the first terminal device may further send the initial time interval and the interval difference determined by the first terminal device to a second terminal device, so that the second terminal device determines, based on the initial time interval and the interval difference, a resource for repeatedly receiving the first TB, to avoid a problem that the first TB cannot be correctly received because the second terminal device does not determine a retransmission resource of the first TB, thereby improving transmission reliability of the first TB.

For example, the first terminal device may send SCI to the second terminal device, and indicate the initial time interval and the interval difference in the SCI. The first terminal device may separately indicate the initial time interval and the interval difference by using two fields in the SCI, or may indicate the initial time interval and the interval difference by using two parts of a same field. This is not specifically limited in embodiments of this application.

Optionally, the first terminal device may further send the maximum quantity of retransmission times of the first TB to the second terminal device, so that the second terminal device determines a quantity of reception times of the first TB.

S402. The first terminal device determines a time domain position of a first time-frequency resource based on the initial time interval and the interval difference.

The first time-frequency resource is a time-frequency resource used when the first TB is transmitted for the $i^{th}$ time, and i is a positive integer greater than or equal to 2 and less than or equal to $R_{max}+1$.

Optionally, that the first terminal device determines a time domain position of a first time-frequency resource based on the initial time interval and the interval difference may be: The first terminal device determines a target time interval based on the initial time interval and the interval difference, and determines the time domain position of the first time-frequency resource based on the target time interval and a time domain position at which the first TB is transmitted for the $(i-1)^{th}$ time.

The target time interval is a time interval between the time domain position at which the first TB is transmitted for the $i^{th}$ time and the time domain position at which the first TB is transmitted for the $(i-1)^{th}$ time. The time domain position at which the first TB is transmitted for the $(i-1)^{th}$ time may be determined by the first terminal device based on the initial time interval and the interval difference. By analogy, the first terminal device determines a time domain position of each time of transmission before the $i^{th}$ time of transmission based on the initial time interval and the interval difference.

For example, the maximum quantity $R_{max}$ of retransmission times is 4. As shown in FIG. 5, if a value of i is 4, that the first terminal device determines a target time interval based on the initial time interval and the interval difference is: The first terminal device determines a time interval $T_3$ between a time domain position ($t_3$) at which the first TB is transmitted for the third time and a time domain position ($t_4$) at which the first TB is transmitted for the fourth time, and then determines, based on $t_3$ and $T_3$, the time domain position at which the first TB is transmitted for the fourth time. The time domain position ($t_3$) at which the first TB is transmitted for the third time may be determined as follows: The first terminal device determines, based on the initial time interval and the interval difference, a time interval $T_2$ between the time domain position ($t_2$) at which the first TB is transmitted for the second time and the time domain position ($t_3$) at which the first TB is transmitted for the third time, and then determines, based on $t_2$ and $T_2$, the time domain position at which the first TB is transmitted for the third time. The time domain position ($t_2$) at which the first TB is transmitted for the second time may be determined as follows: The first terminal device determines, based on the initial time interval and the interval difference, a time interval $T_1$ between the time domain position ($t_1$) at which the first TB is transmitted for the first time and the time domain position ($t_2$) at which the first TB is transmitted for the second time, and then determines, based on $t_1$ and $T_1$, the time domain position at which the first TB is transmitted for the second time.

Optionally, the target time interval may satisfy a plurality of types of relationships. In a possible implementation, the target time interval may satisfy the following first relationship:

$$T_{i-1} = (i-2) * TD_{gap} + TI_{gap}.$$

Herein, $T_{i-1}$ is the target time interval, $TI_{gap}$ is the initial time interval, and $TD_{gap}$ is the interval difference. In other words, the first terminal device may determine the target time interval based on the first relationship.

For example, the maximum quantity $R_{max}$ of retransmission times is 4, a value of the initial time interval $TI_{gap}$ is 2, and a value of the interval difference is 1. When i is 2, $T_1=TI_{gap}=2$. When i is 3, $T_2=TD_{gap}+TI_{gap}=3$. When i is 4, $T_3=2*TD_{gap}+TI_{gap}=4$. When i is 5, $T_4=3*TD_{gap}+TI_{gap}=5$.

In another possible implementation, the target time interval may satisfy the following second relationship:

$$T_{i-1} = TI_{gap} - (i-2) * TD_{gap}.$$

Herein, $T_{i-1}$ is the target time interval, $TI_{gap}$ is the initial time interval, and $TD_{gap}$ is the interval difference. In other words, the first terminal device may determine the target time interval based on the second relationship.

For example, the maximum quantity $R_{max}$ of retransmission times is 4, a value of the initial time interval $TI_{gap}$ is 5, and a value of the interval difference is 1. When i is 2, $T_1=TI_{gap}=5$. When i is 3, $T_2=TI_{gap}-TD_{gap}=4$. When i is 4, $T_3=TI_{gap}-2*TD_{gap}=3$. When i is 5, $T_4=TI_{gap}-3*TD_{gap}=2$.

Optionally, after the first terminal device determines the target time interval based on the first relationship or the second relationship, when the time domain position of the first time-frequency resource is determined based on the target time interval and the time domain position at which the first TB is transmitted for the $(i-1)^{th}$ time, the time domain position of the first time-frequency resource may satisfy the following third relationship:

$$t_i^{SL} = (t_{i-1}^{SL} + T_{i-1}) \% t_{T_{MAX}}^{SL}.$$

Herein, $t_i^{SL}$ is the time domain position of the first time-frequency resource, $t_{i-1}^{SL}$ is the time domain position at which the first TB is transmitted for the $(i-1)^{th}$ time, $T_{i-1}$ is the target time interval, $t_{T_{max}}^{SL}$ is a maximum length of a time domain resource pool, and % represents a remainder operation. In other words, the first terminal device may determine the time domain position of the first time-frequency resource based on the third relationship.

Figure 6:
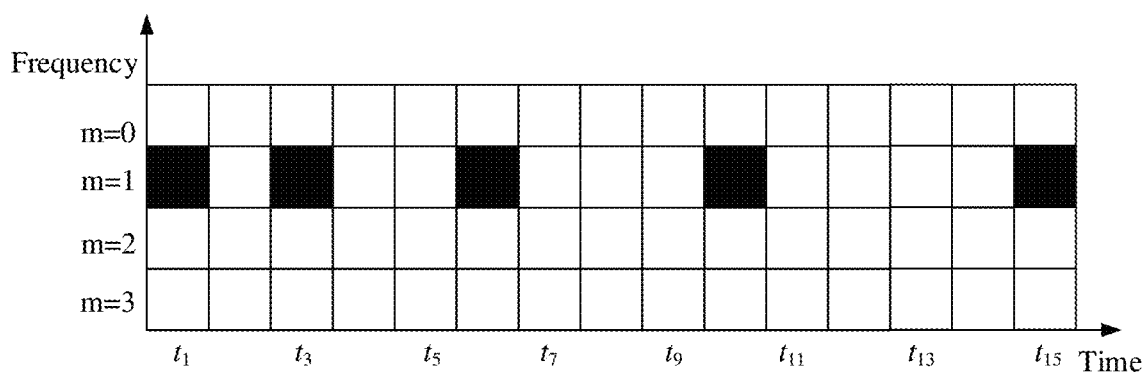
FIG. 6 is a schematic diagram of a time domain position of a time-frequency resource according to an embodiment of this application.

For example, it is assumed that the first terminal device determines the target time interval based on the first relationship, the maximum quantity $R_{max}$ of retransmission times is 4, the value of the initial time interval $TI_{gap}$ is 2, the value of the interval difference is 1, and a value of $t_{T_{max}}^{SL}$ is 1000. As shown in FIG. 6, a horizontal axis represents time, a vertical axis represents frequency, and the time domain position at which the first TB is transmitted for the first time is $t_1$. In this case, the time domain position at which the first TB is transmitted for the second time is $(t_1+T_1)\% t_{T_{max}}^{SL}=3$, the time domain position at which the first TB is transmitted for the third time is $(t_3+T_2)\% t_{T_{max}}^{SL}=t_6$, the time domain position at which the first TB is transmitted for the fourth time is $(t_6+T_3)\% t_{T_{max}}^{SL}=t_{10}$, and the time domain position at which the first TB is transmitted for the fifth time is $(t_{10}+T_4)\% t_{T_{max}}^{SL}=t_{15}$.

Figure 7:
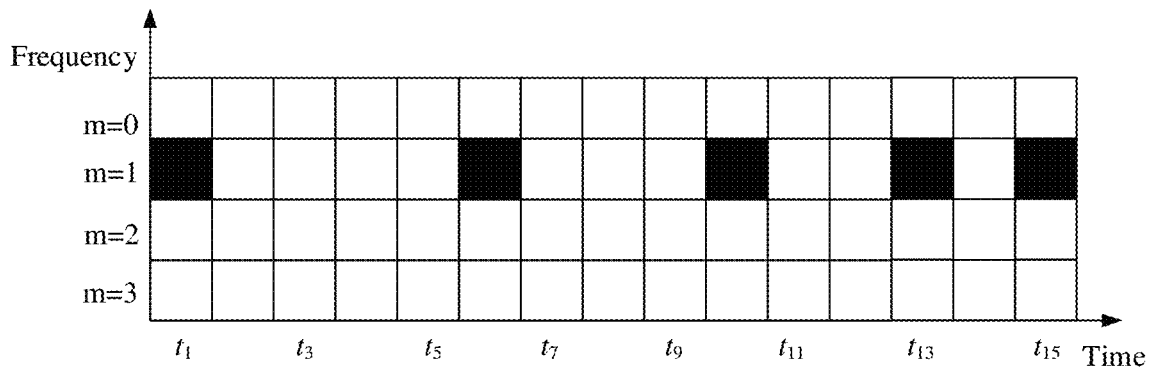
FIG. 7 is a schematic diagram of a time domain position of another time-frequency resource according to an embodiment of this application.

For example, it is assumed that the first terminal device determines the target time interval based on the second relationship, the maximum quantity $R_{max}$ of retransmission times is 4, the value of the initial time interval $TI_{gap}$ is 2, the value of the interval difference is 1, and a value of $t_{T_{max}}^{SL}$ is 1000. As shown in FIG. 7, a horizontal axis represents time, a vertical axis represents frequency, and the time domain position at which the first TB is transmitted for the first time is $t_1$. In this case, the time domain position at which the first TB is transmitted for the second time is $(t_1+T_1)\% t_{T_{max}}^{SL}=t_6$, the time domain position at which the first TB is transmitted for the third time is $(t_6+T_2)\% t_{T_{max}}^{SL}=t_{10}$, the time domain position at which the first TB is transmitted for the fourth time is $(t_{10}+T_3)\% t_{T_{max}}^{SL}=t_{13}$, and the time domain position at which the first TB is transmitted for the fifth time is $(t_{13}+T_4)\% t_{T_{max}}^{SL}=t_{15}$.

It should be noted that FIG. 6 and FIG. 7 are merely examples in which a same frequency domain position is set for each time of transmission of the first TB. That a same frequency domain position is necessarily used for each time of transmission of the first TB is not limited in this embodiment. In actual implementation, a frequency domain position for each time of transmission of the first TB may be determined by the first terminal device.

S403. The second terminal device obtains the initial time interval and the interval difference.

For the initial time interval and the interval difference, refer to the related descriptions in the foregoing step S401. Details are not described herein again.

Optionally, the second terminal device may receive the initial time interval and the interval difference from the first terminal device. Alternatively, when the initial time interval and the interval difference are configured by the network device, the second terminal device may receive the initial time interval and the interval difference from the network device.

S404. The second terminal device determines the time domain position of the first time-frequency resource based on the initial time interval and the interval difference.

The second terminal device may determine the time domain position of the first time-frequency resource in a same manner as the first terminal device. For details, refer to the related descriptions in the foregoing step S402. Details are not described herein again.

S405. The first terminal device sends the first TB to the second terminal device on the first time-frequency resource. Correspondingly, the second terminal device receives the first TB from the first terminal device on the first time-frequency resource.

In step S405, transmission of the first TB between the first terminal device and the second terminal device on the first time-frequency resource is the $i^{th}$ time of transmission of the first TB between the first terminal device and the second terminal device, and the first TB transmitted for the $i^{th}$ time is the same as the first TB transmitted for the first time.

For example, as shown in FIG. 7, the first TB is transmitted for the first time between the first terminal device and the second terminal device at $t_1$, and the maximum quantity $R_{max}$ of retransmission times is 4. In this case, a total quantity of transmission times is 5, that is, i may be 2, 3, 4, or 5. When i is 2, the first TB is transmitted for the second time between the first terminal device and the second terminal device, and the time domain position at which the first TB is transmitted for the second time is $t_6$. When i is 3, the first TB is transmitted for the third time between the first terminal device and the second terminal device, and the time domain position at which the first TB is transmitted for the third time is $t_{10}$. When i is 4, the first TB is transmitted for the fourth time between the first terminal device and the second terminal device, and the time domain position at which the first TB is transmitted for the fourth time is $t_{13}$. When i is 5, the first TB is transmitted for the fifth time between the first terminal device and the second terminal device, and the time domain position at which the first TB is transmitted for the fifth time is $t_{15}$. In addition, the first TB transmitted by the first terminal device and the second terminal device at each of $t_6$, $t_{10}$, $t_{13}$, and $t_{15}$ is the same as the first TB transmitted for the first time (that is, the first TB transmitted at $t_1$). It should be noted that the first time-frequency resource in embodiments of this application includes two parts: the time domain position and a frequency domain position. In the data transmission resource determining method shown in FIG. 4, a manner for determining the time domain position of the first time-frequency resource is described. For a manner for determining the frequency domain position of the first time-frequency resource, the first terminal device and the second terminal device may use the conventional technology, or may use another manner. This is not specifically limited in embodiments of this application.

It should be noted that in this embodiment of this application, there is no strict execution sequence for steps S401 to S404. For example, in the foregoing step S403, in a case in which the second terminal device receives the initial time interval and the interval difference from the network device, there is no strict execution sequence for step S401 and step S403, and step S401 may be performed before step S403, or step S403 may be performed before step S401, or step S401 and step S403 may be simultaneously performed. In the foregoing step S403, in a case in which the second terminal device receives the initial time interval and the interval difference from the first terminal device, step S401 is first performed, the first terminal device sends the initial time interval and the interval difference to the second terminal device after step S401 is performed, and then the second terminal device performs step S403. In this case, there is no necessary sequence for step S402 and step S403, and step S402 may be performed before step S403, or step S402 may be performed before step S403, or step S403 and step S403 may be simultaneously performed. This is not specifically limited in this embodiment of this application.

Based on this solution, the first terminal device may determine, based on the initial time interval and the interval difference, a time domain position of a time-frequency resource used for any time of transmission when a quantity of transmission times is greater than 1. Because the interval difference is not 0, time domain intervals corresponding to all times of retransmission are different, and relative changes of time domain positions for all the times of retransmission are different, so that transmission flexibility can be improved. In addition, the first terminal device can determine, based on only the initial time interval and the interval difference, the time domain position of the time-frequency resource used for any time of transmission when the quantity of transmission times is greater than 1. Therefore, other information used to determine a retransmission time domain position does not need to be obtained, so that transmission overheads can be reduced.

Figure 8:
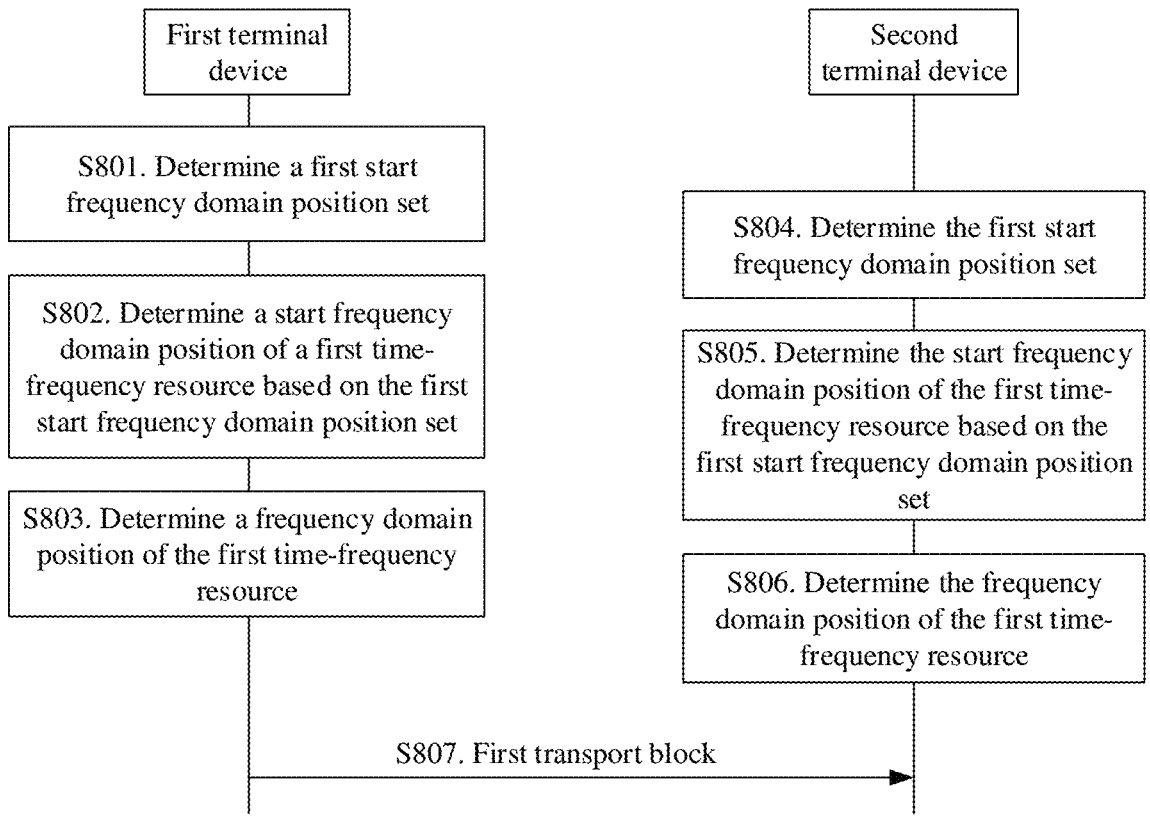
FIG. 8 is a schematic flowchart of another data transmission resource determining method according to an embodiment of this application.

FIG. 8 shows another data transmission resource determining method according to an embodiment of this application. The data transmission resource determining method includes the following steps.

S801. A first terminal device determines a first start frequency domain position set.

The first start frequency domain position set includes X sub-channel indices, and X is a positive integer. The first terminal device may determine the first start frequency domain position set based on a quantity of sub-channels used when a first TB is transmitted for the first time or a start sub-channel index used when the first TB is transmitted for the first time. The start sub-channel index used when the first TB is transmitted for the first time is an index of the $1^{st}$ sub-channel used when the first TB is transmitted for the first time.

It should be noted that, in this embodiment of this application, the sub-channel is a sub-channel in an available frequency domain resource pool corresponding to the first terminal device. The frequency domain resource pool includes a plurality of sub-channels, each sub-channel corresponds to one sub-channel index, each sub-channel corresponds to a different sub-channel index, and each sub-channel includes one or more resource blocks (resource block, RB). This may be specifically configured by a network device. Indices corresponding to the plurality of sub-channels are contiguous, and the plurality of sub-channels may be contiguous physical sub-channels, or may be non-contiguous physical sub-channels. The first terminal device and a second terminal device correspond to a same available frequency domain resource pool. Unified descriptions are provided herein, and are not provided in the following embodiments.

In this embodiment of this application, a "sub-channel index" may also mean a "sub-channel indicated by the sub-channel index", and the two concepts may be replaced with each other. This is not specifically limited in this embodiment of this application.

It should be noted that, in this embodiment of this application, descriptions are provided on the basis that all related information during the first time of transmission of the first TB is known information. Unified descriptions are provided herein, and are not provided in the following embodiments.

The quantity of sub-channels used when the first TB is transmitted for the first time may be understood as a quantity of sub-channels actually occupied by the first TB. If the quantity of sub-channels actually occupied by the first TB is greater than 1, in this embodiment of this application, it is assumed that the first TB occupies sub-channels indicated by contiguous sub-channel indices in the available frequency domain resource pool corresponding to the first terminal device. For example, if the quantity of sub-channels actually occupied by the first TB is 3, sub-channels whose sub-channel indices are 2, 3, and 4 in the frequency domain resource pool may be occupied when the first TB is transmitted for the first time. In this case, the start sub-channel index used when the first TB is transmitted for the first time is 2.

The sub-channels actually occupied by the first TB may also be referred to as a frequency resource block. For example, if the sub-channels whose sub-channel indices are 2, 3, and 4 in the frequency domain resource pool are occupied when the first TB is transmitted for the first time, the sub-channels whose sub-channel indices are 2, 3, and 4 may be referred to as one frequency resource block.

S802. The first terminal device determines a start frequency domain position of a first time-frequency resource based on the first start frequency domain position set.

The first time-frequency resource is a time-frequency resource used when the first TB is transmitted for the $i^{th}$ time, and i is a positive integer greater than or equal to 2 and less than or equal to $R_{max}+1$.

The start frequency domain position of the first time-frequency resource may be understood as the $1^{st}$ sub-channel of a frequency domain position of the first time-frequency resource.

S803. The first terminal device determines the frequency domain position of the first time-frequency resource.

The first terminal device may determine the frequency domain position of the first time-frequency resource based on the start frequency domain position of the first time-frequency resource and the quantity of sub-channels used when the first TB is transmitted for the first time.

The frequency domain position of the first time-frequency resource may be sub-channels that are indicated by L contiguous sub-channel indices and that start from the start frequency domain position of the first time-frequency resource, and L is the quantity of sub-channels used when the first TB is transmitted for the first time. For example, if the start frequency domain position of the first time-frequency resource is a sub-channel 4, and the quantity of sub-channels used when the first TB is transmitted for the first time is 3, the frequency domain position of the first time-frequency resource is the sub-channel 4, a sub-channel 5, and a sub-channel 6.

S804. The second terminal device determines the first start frequency domain position set.

S805. The second terminal device determines the start frequency domain position of the first time-frequency resource based on the first start frequency domain position set.

S806. The second terminal device determines the frequency domain position of the first time-frequency resource.

For steps S804 to S806, refer to the related descriptions in the foregoing steps S801 to S803. Details are not described herein.

S807. The first terminal device sends the first TB to the second terminal device on the first time-frequency resource. Correspondingly, the second terminal device receives the first TB from the first terminal device on the first time-frequency resource.

The first time-frequency resource in embodiments of this application includes two parts: a time domain position and the frequency domain position. In the data transmission resource determining method shown in FIG. 8, a manner for determining the frequency domain position of the first time-frequency resource is described. For a manner for determining the time domain position of the first time-frequency resource, the first terminal device and the second terminal device may use the conventional technology, or may use another manner. This is not specifically limited in embodiments of this application.

It should be noted that in this embodiment of this application, there is no strict execution sequence for step S801 and step S804, and step S801 may be performed before step S804, or step S804 may be performed before step S801, or step S801 and step S804 may be simultaneously performed. This is not specifically limited in this embodiment of this application.

Based on this solution, the first terminal device and the second terminal device can determine the first start frequency domain position set based on a related parameter during the first time of transmission, and determine, based on the first start frequency domain position set, a frequency domain position of a time-frequency resource used for any time of transmission when a quantity of transmission times is greater than 1. Therefore, during two or more times of retransmission of the first TB, transmission overheads caused by configuring information about a frequency domain position can be reduced, and frequency domain positions for all times of retransmission are different. Therefore, transmission flexibility can be further improved.

Optionally, in an implementation scenario of the embodiment shown in FIG. 8, in step S801, details are as follows:

That the first terminal device determines the first start frequency domain position set based on the quantity of sub-channels used when the first TB is transmitted for the first time may be: The first terminal device determines the first start frequency domain position set based on $L_{subCH}$, $N_{subCH}$, and $R_{max}$, where $L_{subCH}$ is the quantity of sub-channels used when the first TB is transmitted for the first time, $N_{subCH}$ is a maximum quantity of sub-channels in the frequency domain resource pool, and $R_{max}$ is a maximum quantity of retransmission times of the first TB.

In a possible implementation, that the first terminal device determines the first start frequency domain position set based on $L_{subCH}$, $N_{subCH}$, and $R_{max}$ may be: The first terminal device determines X+1 sub-channel indices based on $L_{subCH}$, $N_{subCH}$, and $R_{max}$ where the $(X+1)^{th}$ sub-channel index in the X+1 sub-channel indices is the same as the $1^{st}$ sub-channel index in the X+1 sub-channel indices, and first X sub-channel indices in the X+1 sub-channel indices are different from each other; and the first terminal device determines the first X sub-channel indices as sub-channel indices constituting the first start frequency domain position set.

Based on this solution, the first start frequency domain position set may include different sub-channel indices, so that frequency domain positions for all times of transmission that are determined by the terminal device based on the first start frequency domain position set may be different, thereby further improving transmission flexibility.

Optionally, the first terminal device may determine the X+1 sub-channel indices according to the following formula 1:

$$(m_0 + (x-1) * \lceil (N_{subCH} - L_{subCH} + 1)/(R_{max} + 1) \rceil) \% (N_{subCH} - L_{subCH} + 1).$$

Herein, $m_0$ is the start sub-channel index used when the first TB is transmitted for the first time, $R_{max}+1$ represents a total quantity of transmission times, $(N_{subCH}-L_{subCH}+1)$ represents a quantity of available frequency resource blocks in the frequency domain resource pool, $(N_{subCH}-L_{subCH}+1)/(R_{max}+1)$ represents a frequency hopping interval, the symbol % represents a remainder operation, the symbol $\lceil \; \rceil$ represents a ceiling operation, x is a positive integer ranging from 1 to X+1, and one value of x corresponds to one sub-channel index.

Optionally, the first terminal device may take the value of x from 1, and calculate, according to the foregoing formula 1, a sub-channel index corresponding to each different value of x, until a corresponding sub-channel index obtained when x is 1 repeatedly appears for the first time. The first terminal device determines, as the sub-channel indices constituting the first start frequency domain position set, sub-channel indices corresponding to all values of x that are taken before the corresponding sub-channel index obtained when x is 1 repeatedly appears for the first time, and may determine a quantity of sub-channels corresponding to all the values of x that are taken before the corresponding sub-channel index obtained when x is 1 repeatedly appears for the first time, that is, may determine a value of X.

A sequence of the sub-channel indices in the first start frequency domain position set corresponds to the value of x. To be specific, a corresponding sub-channel index obtained when x is 1 is the $1^{st}$ sub-channel index in the first start frequency domain position set, a corresponding sub-channel index obtained when x is 2 is the $2^{nd}$ sub-channel index in the first start frequency domain position set, and by analogy.

For example, $N_{subCH}=8$, $L_{subCH}=2$, $R_{max}=3$, and $m_0=1$. The corresponding sub-channel index obtained when x is 1 is 1, the corresponding sub-channel index obtained when x is 2 is 3, a corresponding sub-channel index obtained when x is 3 is 5, a corresponding sub-channel index obtained when x is 4 is 0, a corresponding sub-channel index obtained when x is 5 is 2, a corresponding sub-channel index obtained when x is 6 is 4, a corresponding sub-channel index obtained when x is 7 is 6, and a corresponding sub-channel index obtained when x is 8 is 1. Because the corresponding sub-channel index obtained when x is 8 is the same as the corresponding sub-channel index obtained when x is 1, the first terminal device may determine that the first start frequency domain position set is {1, 3, 5, 0, 2, 4, 6}, and determine that the value of X is 7. Alternatively, in an example in which $N_{subCH}=8$, $L_{subCH}=2$, $R_{max}=7$, and $m_0=1$, the first terminal device may determine that the first start frequency domain position set is {1, 2, 3, 4, 5, 6, 0}, and determine that the value of X is 7.

Based on this implementation, in step S802, details are as follows:

That the first terminal device determines, based on the first start frequency domain position set, the start frequency domain position of the first time-frequency resource used when the first TB is transmitted for the $i^{th}$ time may be as follows:

If X is greater than or equal to i, the first terminal device determines, as the start frequency domain position of the first time-frequency resource, a sub-channel indicated by a sub-channel index that is in a second start frequency domain position set and that has a longest Euclidean distance from a start sub-channel index used when the first TB is transmitted for the $(i-1)^{th}$ time, and deletes, from the second start frequency domain position set, the sub-channel index corresponding to the start frequency domain position of the first time-frequency resource.

An initial set of the second start frequency domain position set includes a sub-channel index in the first start frequency domain position set other than the $1^{st}$ sub-channel index in the first start frequency domain position set. For example, if the first start frequency domain position set is {1, 3, 5, 0, 2, 4, 6}, the initial set of the second start frequency domain position set is {3, 5, 0, 2, 4, 6}.

If X is less than i, the first terminal device determines n third start frequency domain position sets, where an initial set of each third start frequency domain position set in the n third start frequency domain position sets is the same as the first start frequency domain position set, $n=\lceil i/X \rceil-1$, and $\lceil \; \rceil$ represents a ceiling operation. In this case, that the first terminal device determines the start frequency domain position of the first time-frequency resource may be as follows:

If i % X=1, the first terminal device determines, as the start frequency domain position of the first time-frequency resource, a sub-channel indicated by the $1^{st}$ sub-channel index in the $n^{th}$ third start frequency domain position set. If i % X≠1, the first terminal device determines, as the start frequency domain position of the first time-frequency resource, a sub-channel indicated by a sub-channel index that is in the $n^{th}$ third start frequency domain position set and that has a longest Euclidean distance from a start sub-channel index used when the first TB is transmitted for the $(i-1)^{th}$ time. After determining the start frequency domain position of the first time-frequency resource, the first terminal deletes, from the $n^{th}$ third start frequency domain position set, the sub-channel index corresponding to the start frequency domain position of the first time-frequency resource.

Alternatively, the first terminal device directly determines, as the start frequency domain position of the first time-frequency resource, a sub-channel indicated by a sub-channel index that is in the $n^{th}$ third start frequency domain position set and that has a longest Euclidean distance from a start sub-channel index used when the first TB is transmitted for the $(i-1)^{th}$ time. After determining the start frequency domain position of the first time-frequency resource, the first terminal deletes, from the $n^{th}$ third start frequency domain position set, the sub-channel index corresponding to the start frequency domain position of the first time-frequency resource.

Based on this solution, because a Euclidean distance between a start frequency domain position for each time of retransmission and a start frequency domain position for a previous time of retransmission is the longest, a change between frequency domain positions for two consecutive times of retransmission is relatively large, so that a frequency diversity gain can be fully used, thereby improving transmission reliability.

The following uses a specific example to describe a method in which the first terminal device determines the start frequency domain position of the first time-frequency resource.

Figure 9:
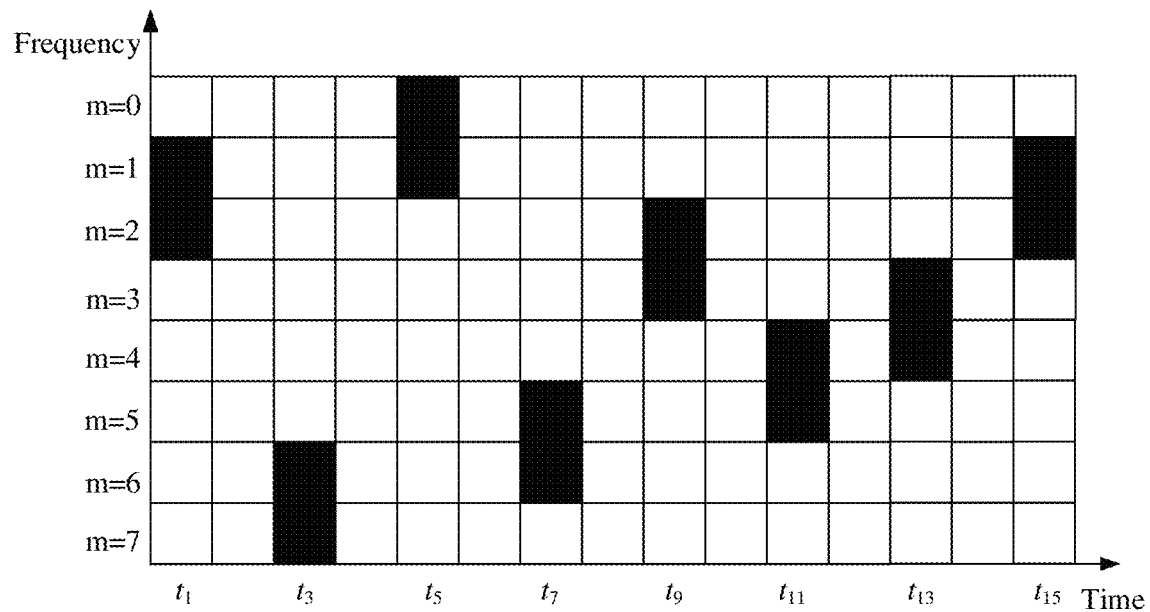
FIG. 9 is a schematic diagram 1 of a frequency domain position of a time-frequency resource according to an embodiment of this application.

For example, the first start frequency domain position set is {1, 3, 5, 0, 2, 4, 6}, that is, the value of X is 7, the initial set of the second start frequency domain position set is {3, 5, 0, 2, 4, 6}, $N_{subCH}$=8, $L_{subCH}$=2, and $R_{max}$=9, that is, 2≤i≤10. In this case, details are as follows:

When the value of i is 2, a start frequency domain position of the second time of transmission is a sub-channel indicated by a sub-channel index 6 that is in the second start frequency domain position set {3, 5, 0, 2, 4, 6} and that has a longest Euclidean distance from the start sub-channel index used when the first TB is transmitted for the first time, that is, $m_1$=6. As shown in FIG. 9, a frequency domain position of the second time of transmission is sub-channels indicated by a sub-channel 6 and a sub-channel 7. Then, the first terminal device deletes 6 from the second start frequency domain position set.

When the value of i is 3, a start frequency domain position of the third time of transmission is a sub-channel index indicated by a sub-channel index 0 that is in the second start frequency domain position set {3, 5, 0, 2, 4} and that has a longest Euclidean distance from a start sub-channel index used when the first TB is transmitted for the second time, that is, $m_2$=0. As shown in FIG. 9, a frequency domain position of the third time of transmission is sub-channels indicated by a sub-channel 0 and a sub-channel 1. Then, the first terminal device deletes 0 from the second start frequency domain position set.

When the value of i is 4, a start frequency domain position of the fourth time of transmission is a sub-channel index indicated by a sub-channel index 5 that is in the second start frequency domain position set {3, 5, 2, 4} and that has a longest Euclidean distance from a start sub-channel index used when the first TB is transmitted for the third time, that is, $m_3$=5. As shown in FIG. 9, a frequency domain position of the fourth time of transmission is sub-channels indicated by a sub-channel 5 and a sub-channel 6. Then, the first terminal device deletes 5 from the second start frequency domain position set.

When the value of i is 5, a start frequency domain position of the fifth time of transmission is a sub-channel index indicated by a sub-channel index 5 that is in the second start frequency domain position set {3, 2, 4} and that has a longest Euclidean distance from a start sub-channel index used when the first TB is transmitted for the fourth time, that is, $m_4$=2. As shown in FIG. 9, a frequency domain position of the fifth time of transmission is sub-channels indicated by a sub-channel 2 and a sub-channel 3. Then, the first terminal device deletes 2 from the second start frequency domain position set.

When the value of i is 6, a start frequency domain position of the sixth time of transmission is a sub-channel index indicated by a sub-channel index 4 that is in the second start frequency domain position set {3, 4} and that has a longest Euclidean distance from a start sub-channel index used when the first TB is transmitted for the fifth time, that is, $m_5$=4. As shown in FIG. 9, a frequency domain position of the sixth time of transmission is sub-channels indicated by a sub-channel 4 and a sub-channel 5. Then, the first terminal device deletes 4 from the second start frequency domain position set.

When the value of i is 7, a start frequency domain position of the seventh time of transmission is a sub-channel index indicated by a sub-channel index 3 that is in the second start frequency domain position set {3} and that has a longest Euclidean distance from a start sub-channel index used when the first TB is transmitted for the sixth time, that is, $m_6$=3. As shown in FIG. 9, a frequency domain position of the seventh time of transmission is sub-channels indicated by a sub-channel 3 and a sub-channel 4. Then, the first terminal device deletes 3 from the second start frequency domain position set.

When i is 8, 9, or 10, the first terminal device determines one third start frequency domain position set, and an initial set of the third start frequency domain position set is the same as the first start frequency domain position set, that is, {1, 3, 5, 0, 2, 4, 6}.

Figure 10:
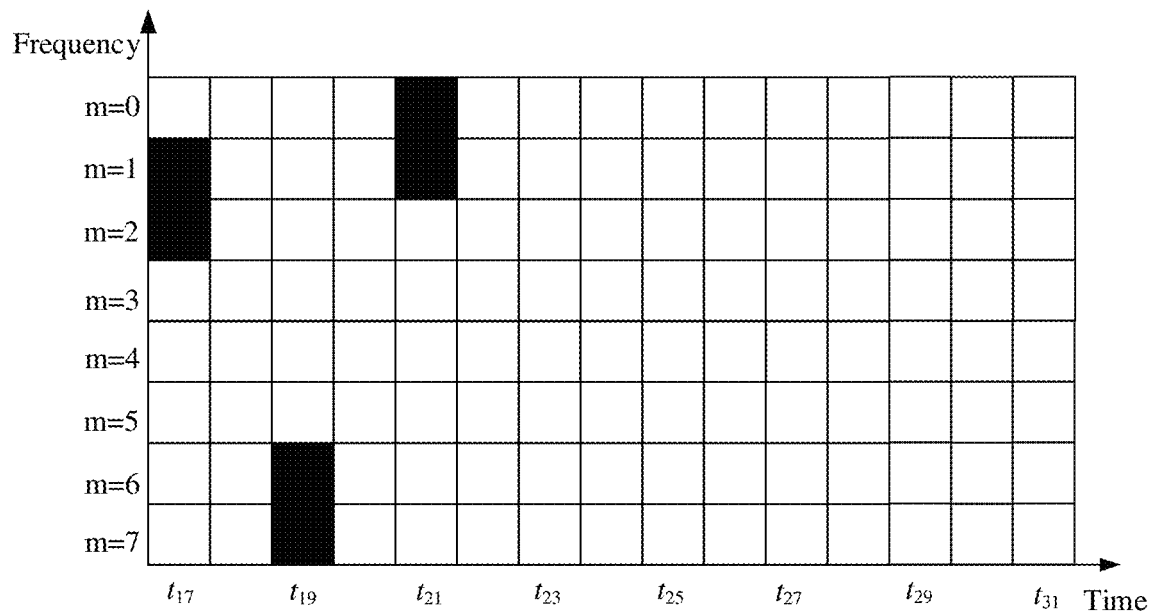
FIG. 10 is a schematic diagram 2 of a frequency domain position of a time-frequency resource according to an embodiment of this application.

In this case, there may be the following two manners:
Manner 1:
When the value of i is 8, i % X=1. In this case, a start frequency domain position of the eighth time of transmission is a sub-channel indicated by the 1$^{st}$ sub-channel index in the 1$^{st}$ third start frequency domain position set, that is, $m_8$=1. As shown in FIG. 10, a frequency domain position of the eighth time of transmission is sub-channels indicated by a sub-channel 1 and a sub-channel 2. Then, the first terminal device deletes 1 from the 1$^{st}$ third start frequency domain position set.

When the value of i is 9, i % X≠1. In this case, a start frequency domain position of the ninth time of transmission is a sub-channel index indicated by a sub-channel index 6 that is in the 1$^{st}$ third start frequency domain position set {3, 5, 0, 2, 4, 6} and that has a longest Euclidean distance from a start sub-channel index used when the first TB is transmitted for the eighth time, that is, $m_9$=6. As shown in FIG. 10, a frequency domain position of the ninth time of transmission is sub-channels indicated by a sub-channel 6 and a sub-channel 7. Then, the first terminal device deletes 6 from the 1$^{st}$ third start frequency domain position set.

Figure 11:
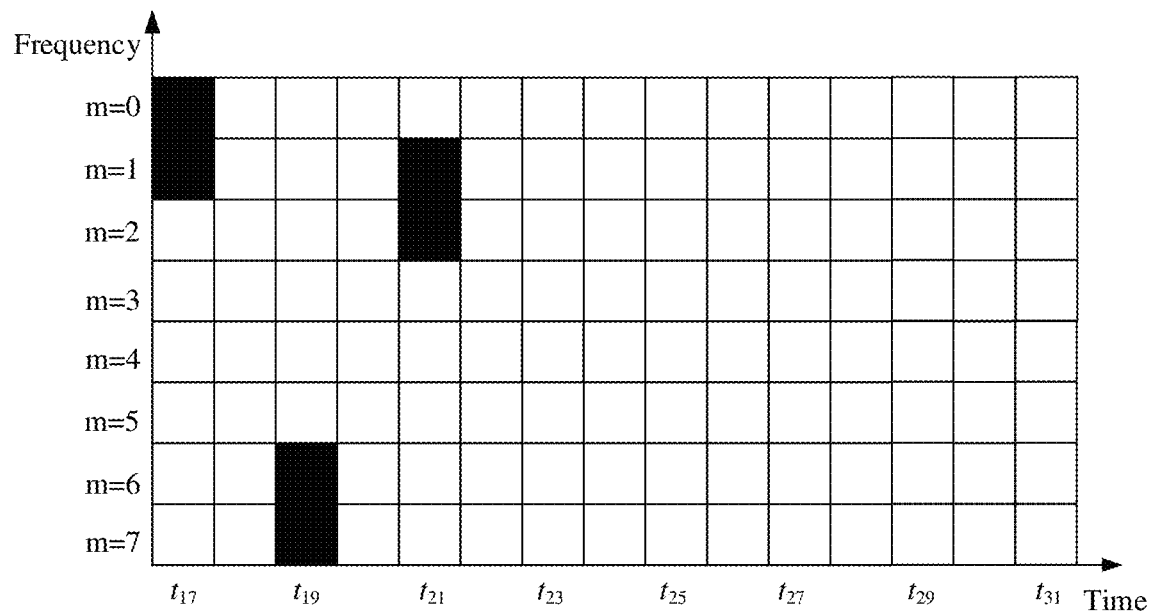
FIG. 11 is a schematic diagram 3 of a frequency domain position of a time-frequency resource according to an embodiment of this application.

When the value of i is 10, i % X≠1. In this case, a start frequency domain position of the tenth time of transmission is a sub-channel index indicated by a sub-channel index 0 that is in the 1$^{st}$ third start frequency domain position set {3, 5, 0, 2, 4} and that has a longest Euclidean distance from a start sub-channel index used when the first TB is transmitted for the ninth time, that is, $m_{10}$=0. As shown in FIG. 10, a frequency domain position of the tenth time of transmission is sub-channels indicated by a sub-channel 0 and a sub-channel 1. Then, the first terminal device deletes 0 from the 1$^{st}$ third start frequency domain position set.
Manner 2:
When the value of i is 8, a start frequency domain position of the eighth time of transmission is a sub-channel index indicated by a sub-channel index 6 or a sub-channel index 0 that is in the 1$^{st}$ third start frequency domain position set {1, 3, 5, 0, 2, 4, 6} and that has a longest Euclidean distance from a start sub-channel index used when the first TB is transmitted for the seventh time. If $m_8$=6, a start frequency domain position obtained when the value of i is 8, 9, or 10 is the same as that in the foregoing implementation. Herein, $m_8$=0 is used for description. As shown in FIG. 11, a frequency domain position of the eighth time of transmission is sub-channels indicated by a sub-channel 0 and a sub-channel 1. Then, the first terminal device deletes 0 from the 1$^{st}$ third start frequency domain position set.

When the value of i is 9, a start frequency domain position of the ninth time of transmission is a sub-channel index indicated by a sub-channel index 6 that is in the 1$^{st}$ third start frequency domain position set {1, 3, 5, 2, 4, 6} and that has a longest Euclidean distance from a start sub-channel index used when the first TB is transmitted for the eighth time, that is, $m_9$=6. As shown in FIG. 11, a frequency domain position of the ninth time of transmission is sub-channels indicated by a sub-channel 6 and a sub-channel 7. Then, the first terminal device deletes 6 from the $1^{st}$ third start frequency domain position set.

When the value of i is 10, a start frequency domain position of the tenth time of transmission is a sub-channel index indicated by a sub-channel index 0 that is in the $1^{st}$ third start frequency domain position set {1, 3, 5, 2, 4} and that has a longest Euclidean distance from a start sub-channel index used when the first TB is transmitted for the ninth time, that is, $m_{10}$=1. As shown in FIG. 11, a frequency domain position of the tenth time of transmission is sub-channels indicated by a sub-channel 1 and a sub-channel 2. Then, the first terminal device deletes 1 from the $1^{st}$ third start frequency domain position set.

In another possible implementation, that the first terminal device determines the first start frequency domain position set based on $L_{subCH}$, $N_{subCH}$, and $R_{max}$ may be: The first terminal device still determines the first start frequency domain position set according to the first formula:

$$(m_0 + (x-1) * \lceil (N_{subCH} - L_{subCH} + 1)/(R_{max} + 1) \rceil) \% (N_{subCH} - L_{subCH} + 1).$$

A difference from the first possible implementation lies in that x is a positive integer ranging from 1 to $R_{max}$+1. In this case, the first start frequency domain position set includes $R_{max}$+1 sub-channel indices.

For example, $N_{subCH}$=8 and $L_{subCH}$=2. When $R_{max}$=7 and $m_0$=1, the first start frequency domain position set is {1, 2, 3, 4, 5, 6, 0, 1}. When $R_{max}$=3 and $m_0$=1, the first start frequency domain position set is {1, 3, 5, 0}. Based on this implementation, in step S802, details are as follows:

That the first terminal device determines, based on the first start frequency domain position set, the start frequency domain position of the first time-frequency resource used when the first TB is transmitted for the $i^{th}$ time may be as follows:

If the first start frequency domain position set does not include repeated sub-channel indices, the first terminal device determines, as the start frequency domain position of the first time-frequency resource, a sub-channel indicated by a sub-channel index that is in a fourth start frequency domain position set and that has a longest Euclidean distance from a start sub-channel index used when the first TB is transmitted for the $(i-1)^{th}$ time, and deletes, from the fourth start frequency domain position set, the sub-channel index corresponding to the start frequency domain position of the first time-frequency resource.

An initial set of the fourth start frequency domain position set includes a sub-channel index in the first start frequency domain position set other than the $1^{st}$ sub-channel index in the first start frequency domain position set.

For example, if $N_{subCH}$=8, $L_{subCH}$=2, $R_{max}$=3, and $m_0$=1, the first start frequency domain position set is {1, 3, 5, 0}, and the initial set of the fourth start frequency domain position set is {3, 5, 0}. In addition, a start frequency domain position of the second time of transmission is 5, a start frequency domain position of the third time of transmission is 0, and a start frequency domain position of the fourth time of transmission is 3.

If the first start frequency domain position set includes repeated sub-channel indices, the first terminal device divides the first start frequency domain position set into p subsets. First p−1 subsets in the p subsets are the same, and each subset in the first p−1 subsets includes all sub-channel indices in the first start frequency domain position set that are from the $1^{st}$ sub-channel index to the last sub-channel index obtained before the $1^{st}$ sub-channel index repeatedly appears for the first time. In this case, that the first terminal device determines the start frequency domain position of the first time-frequency resource may be as follows:

The first terminal device determines, as a start frequency domain position of the first time of transmission, a sub-channel indicated by the $1^{st}$ sub-channel index in the $1^{st}$ subset in the p subsets, and deletes the $1^{st}$ sub-channel index in the $1^{st}$ subset from the $1^{st}$ subset. A start frequency domain position of the second time of transmission is a sub-channel indicated by a sub-channel index that is in the $1^{st}$ subset in the p subsets and that has a longest Euclidean distance from a start sub-channel index for the first time of transmission, and the sub-channel index determined this time is deleted from the $1^{st}$ subset, until the $1^{st}$ subset is empty. Then, a start sub-channel index starts to be determined from the $1^{st}$ sub-channel index in the $2^{nd}$ subset, and by analogy, until all the p subsets are empty.

For example, if $N_{subCH}$=8, $L_{subCH}$=2, $R_{max}$=7, and $m_0$=1, the first start frequency domain position set is {1, 2, 3, 4, 5, 6, 0, 1}, and the first terminal device divides the first start frequency domain position set into two subsets: {1, 2, 3, 4, 5, 6, 0} and {1}. In this case, start frequency domain positions of the first time of transmission to the eighth time of transmission are respectively a sub-channel 1, a sub-channel 6, a sub-channel 0, a sub-channel 5, a sub-channel 2, a sub-channel 4, a sub-channel 3, and the sub-channel 1.

Optionally, in another implementation scenario of the embodiment shown in FIG. 8, in step S801, details are as follows:

In a possible implementation, that the first terminal device determines a first start frequency domain position set based on a start sub-channel index used when the first TB is transmitted for the first time may be: The first terminal device determines the first start frequency domain position set based on the start sub-channel index used when the first TB is transmitted for the first time and a first number sequence.

The first number sequence includes $N_{subCH}$ sub-channel indices, $N_{subCH}$ is a maximum quantity of sub-channels in the frequency domain resource pool, the $N_{subCH}$ sub-channel indices include the start sub-channel index used when the first TB is transmitted for the first time, the $N_{subCH}$ sub-channel indices are different from each other, and the $N_{subCH}$ sub-channel indices in the first number sequence are arranged in ascending order. For example, if $N_{subCH}$=8, and the start sub-channel index used when the first TB is transmitted for the first time is 2, the eight sub-channel indices included in the first number sequence may be {1, 2, 3, 4, 5, 6, 7, 8} or {0, 1, 2, 3, 4, 5, 6, 7}.

Optionally, that the first terminal device determines the first start frequency domain position set based on the start sub-channel index used when the first TB is transmitted for the first time and a first number sequence may be: The first terminal device converts the first number sequence into a second number sequence according to a preset rule; determines a first sub-channel index; and finally determines the first start frequency domain position set based on the first sub-channel index and the second number sequence.

A length of the second number sequence is the same as that of the first number sequence, that is, the second number sequence also includes $N_{subCH}$ sub-channel indices, and the sub-channel indices included in the second number sequence are the same as those included in the first number sequence.

However, an order of the sub-channel indices in the second number sequence is different from an order of the sub-channel indices in the first number sequence. In addition, a correspondence between the first number sequence and the second number sequence may be understood as that the $y^{th}$ sub-channel index in the first number sequence corresponds to the $y^{th}$ sub-channel index in the second number sequence, where y is a positive integer greater than or equal to 1 and less than or equal to $N_{subCH}$.

For example, if the $N_{subCH}$ sub-channel indices included in the first number sequence are {1, 2, 3, 4, 5, 6, 7, 8}, the $N_{subCH}$ sub-channel indices included in the second number sequence may be {7, 8, 6, 4, 3, 5, 1, 2}, and the $1^{st}$ sub-channel index 1 in the first number sequence corresponds to the $1^{st}$ sub-channel index 7 in the second number sequence.

The first sub-channel index is a sub-channel index that is in the second number sequence and that corresponds to the start sub-channel index used when the first TB is transmitted for the first time, and each sub-channel index in the first start frequency domain position set is less than or equal to a first value.

Optionally, the first value may be determined based on the $1^{st}$ sub-channel index in the first number sequence. For example, if the $1^{st}$ sub-channel index in the first number sequence is 0, the first value is $N_{subCH}-L_{subCH}$, or if the $1^{st}$ sub-channel index in the first number sequence is 1, the first value is $N_{subCH}-L_{subCH}+1$, and $L_{subCH}$ is a quantity of sub-channels used when the first TB is transmitted for the first time.

Optionally, the preset rule may be converting the first number sequence into the second number sequence by using an interleaving matrix. For example, the sub-channel indices in the first number sequence are read into the interleaving matrix row by row, and then are read column by column to obtain the second number sequence.

Figure 12:
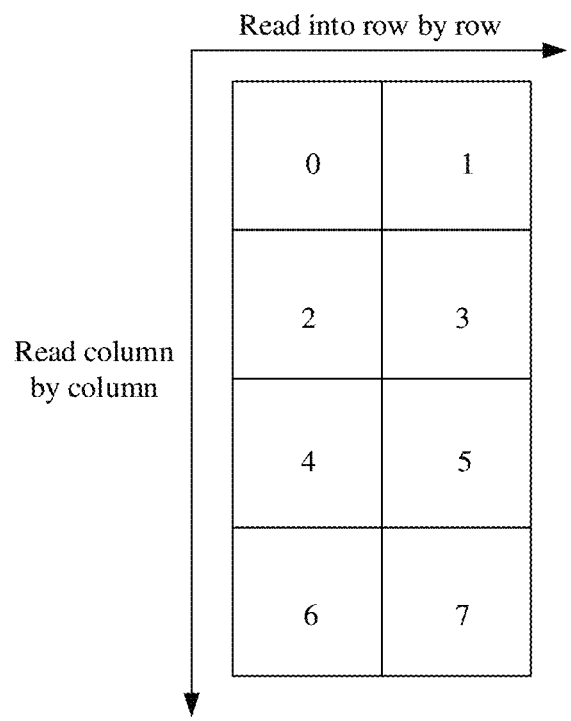
FIG. 12 is a schematic diagram of number sequence conversion according to an embodiment of this application.

For example, if $N_{subCH}=8$, the interleaving matrix is a matrix with four rows and two columns, and eight sub-channel indices included in the first number sequence are {0, 1, 2, 3, 4, 5, 6, 7}, a result obtained after the first number sequence is read into the interleaving matrix row by row is shown in FIG. 12. In this case, the second number sequence obtained by reading elements in the interleaving matrix column by column is {0, 2, 4, 6, 1, 3, 5, 7}, and the correspondence between the first number sequence and the second number sequence may be shown in FIG. 13. In this case, if the start sub-channel index used when the first TB is transmitted for the first time is 2, the sub-channel index that is in the second number sequence and that corresponds to the start sub-channel index used when the first TB is transmitted for the first time is 4, that is, the first sub-channel index is 4.

Optionally, that the first terminal device determines the first start frequency domain position set based on the first sub-channel index and the second number sequence may be as follows:

If the first sub-channel index is less than or equal to the first value, the first terminal device determines the first sub-channel index as the $1^{st}$ sub-channel index in the first start frequency domain position set; or if the first sub-channel index is greater than the first value, the first terminal device determines, as the $1^{st}$ sub-channel index in the first start frequency domain position set, a next sub-channel index that is less than or equal to the first value and that is closest to the first sub-channel index in the second number sequence, where a next sub-channel index that is in the second number sequence and that is closest to the last sub-channel index in the second number sequence is the $1^{st}$ sub-channel index in the second number sequence; and then the first terminal device determines, as the $(m+1)^{th}$ sub-channel index in the first start frequency domain position set, a next sub-channel index that is in the second number sequence, that is closest to the $m^{th}$ sub-channel index in the first start frequency domain position set, and that is less than or equal to the first value, where m is a positive integer ranging from 1 to X–1, that is, the first start frequency domain position set includes $R_{max}$ sub-channel indices.

Figure 13:
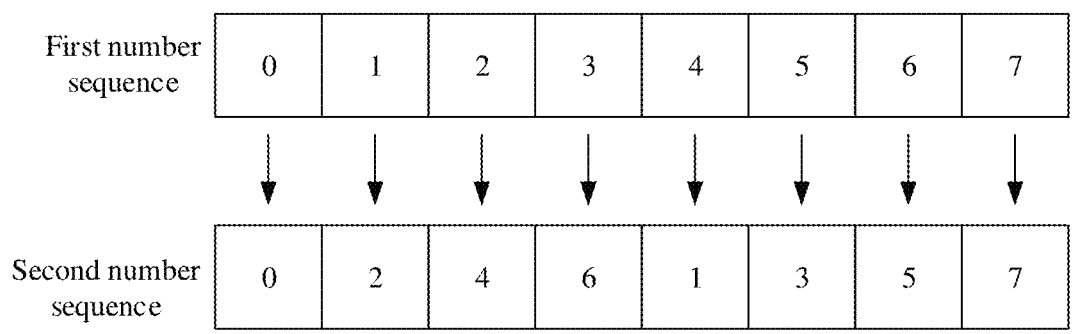
FIG. 13 is a schematic diagram of a number sequence correspondence according to an embodiment of this application.

For example, $N_{subCH}=8$, $L_{subCH}=3$, $R_{max}=7$, the start sub-channel index used when the first TB is transmitted for the first time is 2, the eight sub-channel indices included in the first number sequence are {0, 1, 2, 3, 4, 5, 6, 7}, the first value is 5, and the correspondence between the first number sequence and the second number sequence is shown in FIG. 13. In this case, details are as follows:

If the first sub-channel index in the first start frequency domain position set is 4 that is less than the first value 5, the $1^{st}$ sub-channel index in the first start frequency domain position set is 4.

The $2^{nd}$ sub-channel index in the first start frequency domain position set is a next index 1 that is closest to 4 in the second number sequence and that is less than or equal to 5.

The $3^{rd}$ sub-channel index in the first start frequency domain position set is a next index 3 that is closest to 1 in the second number sequence and that is less than or equal to 5.

The $4^{th}$ sub-channel index in the first start frequency domain position set is a next index 5 that is closest to 3 in the second number sequence and that is less than or equal to 5.

When the $5^{th}$ sub-channel index is determined, a next index closest to the index 5 in the second number sequence is 7. 7 is greater than 5. Therefore, a next index closest to the index 7 continues to be searched for. Because 7 is the last index in the second number sequence, determining continues to be performed from the $1^{st}$ index in the second number sequence. To be specific, the next index closest to the index 7 is the $1^{st}$ index 0 in the second number sequence. Because 0 is less than 5, the $5^{th}$ sub-channel index is 0.

The $6^{th}$ sub-channel index in the first start frequency domain position set is a next index 2 that is closest to 0 in the second number sequence and that is less than or equal to 5.

The $7^{th}$ sub-channel index in the first start frequency domain position set is a next index 4 that is closest to 2 in the second number sequence and that is less than or equal to 5.

Based on this implementation, in step S802, details are as follows:

That the first terminal device determines, based on the first start frequency domain position set, the start frequency domain position of the first time-frequency resource used during the $i^{th}$ time of transmission may be as follows:

The first terminal device determines, as the start frequency domain position of the first time-frequency resource, a sub-channel indicated by the $(i-1)^{th}$ sub-channel index in the first start frequency domain position set.

Figure 14:
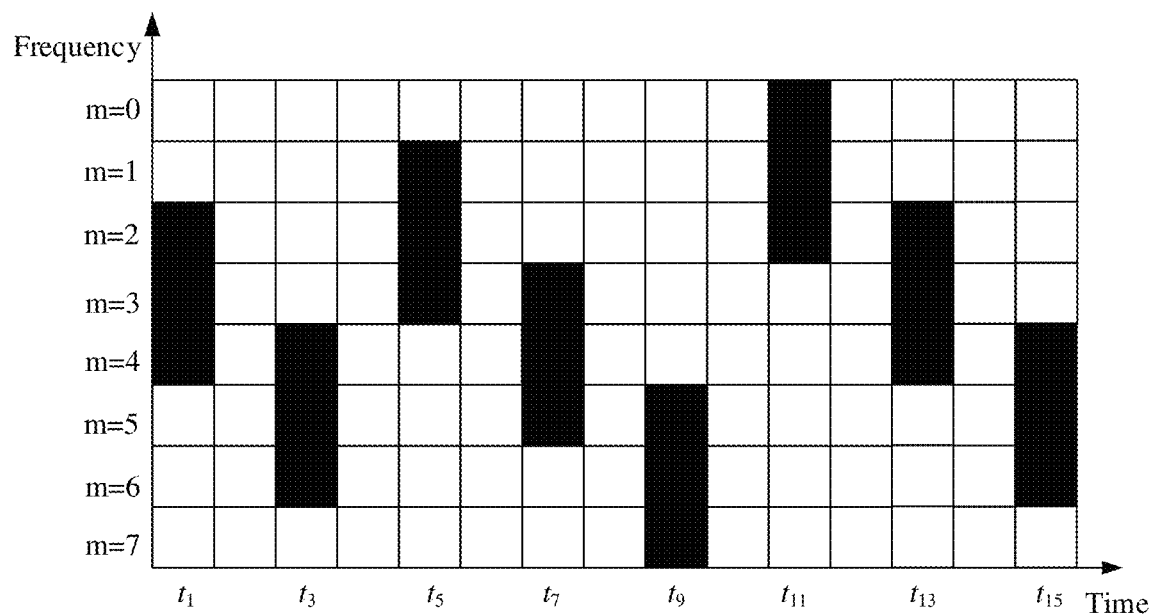
FIG. 14 is a schematic diagram 4 of a frequency domain position of a time-frequency resource according to an embodiment of this application.

For example, based on the first start frequency domain position set {4, 1, 3, 5, 0, 2, 4} determined in the foregoing example, start frequency domain positions of the second time of transmission to the eighth time of transmission performed by the first terminal device are respectively sub-channels indicated by the sub-channel index 4, the sub-channel index 1, the sub-channel index 3, the sub-channel index 5, the sub-channel index 0, the sub-channel index 2, and the sub-channel index 4, and frequency domain positions of the second time of transmission to the eighth time of transmission may be shown in FIG. 14.

In another possible implementation, the first terminal device may determine the first start frequency domain position set based on all sub-channel indices used when the first TB is transmitted for the first time and a first number sequence.

Optionally, the first terminal device may convert the first number sequence into a second number sequence according to a preset rule. For details, refer to the foregoing implementation. Then, based on a correspondence between the first number sequence and the second number sequence, sub-channel indices in the second number sequence that correspond to all the sub-channel indices used when the first TB is transmitted for the first time are determined as sub-channel indices constituting the first start frequency domain position set.

For example, if the correspondence between the first number sequence and the second number sequence is shown in FIG. 13, and all the sub-channel indices used when the first TB is transmitted for the first time are 2, 3, and 4, the first terminal device determines, as the sub-channel indices in the first start frequency domain position set, 4, 6, and 1 in the second number sequence that respectively correspond to 2, 3, and 4, that is, the first start frequency domain position set is {4, 6, 1}.

Based on this implementation, in step S802, details are as follows:

That the first terminal device determines, based on the first start frequency domain position set, the start frequency domain position of the first time-frequency resource used during the it time of transmission may be as follows:

If $(i-1)\% L_{subCH} \neq 0$, the first terminal device determines, as the start frequency domain position of the first time-frequency resource, a sub-channel indicated by the $((i-1)\% L_{subCH})^{th}$ sub-channel index in the first start frequency domain position set. Alternatively, if $(i-1)\% L_{subCH} = 0$, the first terminal device determines, as the start frequency domain position of the first time-frequency resource, a sub-channel indicated by the last sub-channel index in the first start frequency domain position set.

Optionally, if a frequency domain position that is of the first time-frequency resource and that is determined based on the start frequency domain position of the first time-frequency resource and $L_{subCH}$ is non-contiguous, the frequency domain position is moved forward to obtain a first contiguous frequency domain position that has a shortest Euclidean distance from the non-contiguous frequency domain position, and is moved backward to obtain a second contiguous frequency domain position that has a shortest Euclidean distance from the non-contiguous frequency domain position. Then, Euclidean distances from start frequency domain positions of the first contiguous frequency domain position and the second contiguous frequency domain position to the start frequency domain position of the $(i-1)^{th}$ time of transmission are separately calculated, and a contiguous frequency domain position corresponding to an obtained start frequency domain position with a longest Euclidean distance is determined as the frequency domain position of the $i^{th}$ time of transmission.

Figure 15:
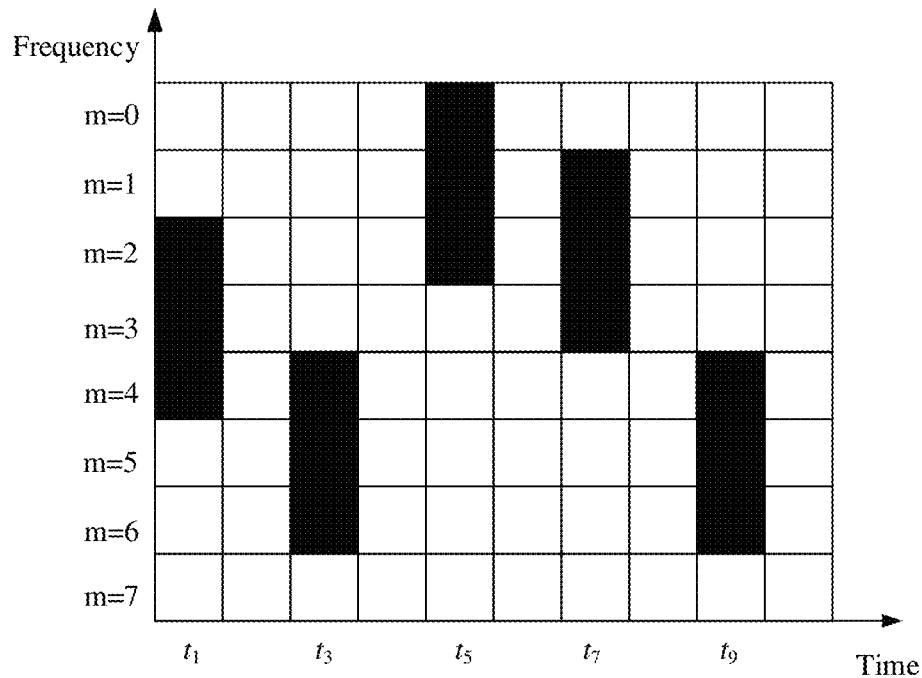
FIG. 15 is a schematic diagram 5 of a frequency domain position of a time-frequency resource according to an embodiment of this application.

For example, if $R_{max}=4$, based on the first start frequency domain position set {4, 6, 1} determined in the foregoing example, as shown in FIG. 15, the frequency domain position of the second time of transmission performed by the first terminal device is sub-channels indicated by sub-channel indices 4, 5, and 6, and the frequency domain position of the third time of transmission is sub-channels indicated by sub-channel indices 6, 7, and 0. However, because the sub-channel indices 6, 7, and 0 are non-contiguous, the first terminal device moves the frequency domain position forward to obtain a first contiguous frequency domain position 5, 6, and 7, and moves the frequency domain position backward to obtain a second contiguous frequency domain position 0, 1, and 2. Start frequency domain positions of the first contiguous frequency domain position and the second contiguous frequency domain position are respectively 5 and 0. A Euclidean distance between 0 and the start frequency domain position 4 of the second time of transmission is the longest. Therefore, the frequency domain position of the third time of transmission is 0, 1, and 2, the frequency domain position of the fourth time of transmission is 1, 2, and 3, and the frequency domain position of the fifth time of transmission is 4, 5, and 6.

It should be noted that in the data transmission resource determining method shown in FIG. 8, implementations of the first terminal device in steps S801 to S803 may all be applied to related implementations of the second terminal device in steps S804 to S806.

It should be noted that, in embodiments of this application, the data transmission resource determining methods shown in FIG. 4 and FIG. 8 may be separately performed, or may be performed in combination. In this case, the first terminal device and the second terminal device determine, by using the data transmission resource determining method shown in FIG. 4, the time domain position of the first time-frequency resource used during the $i^{th}$ time of transmission, and determine the frequency domain position of the first time-frequency resource by using the data transmission resource determining method shown in FIG. 8. Based on this, both a time diversity gain and a frequency diversity gain can be increased, thereby further improving data transmission reliability.

Figure 16:
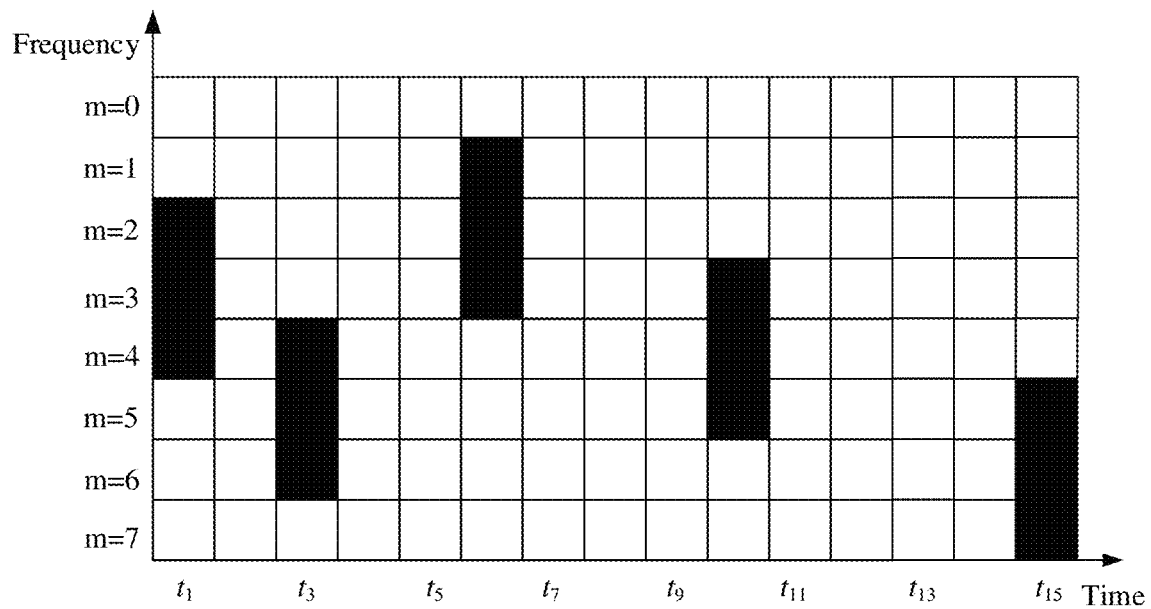
FIG. 16 is a schematic diagram of a time-frequency position of a time-frequency resource according to an embodiment of this application.

For example, if the time domain position during the $i^{th}$ time of transmission that is determined by the first terminal device and the second terminal device by using the method shown in FIG. 4 is shown in FIG. 6, and the time domain position during the $i^{th}$ time of transmission that is determined by the first terminal device and the second terminal device by using the method shown in FIG. 8 is shown in FIG. 14, a time-frequency resource position during the $i^{th}$ time of transmission may be shown in FIG. 16.

It may be understood that in embodiments of this application, a terminal device may perform some or all of the steps in embodiments of this application, and these steps or operations are merely examples. In embodiments of this application, another operation or various operation variants may further be performed. In addition, the steps may be performed in a sequence different from a sequence presented in embodiments of this application, and not all operations in embodiments of this application may be performed.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

It may be understood that, in the foregoing embodiments, the method and/or step implemented by the first terminal device may be implemented by a component (such as a chip or a circuit) that can be used in the first terminal device, and the method and/or step implemented by the second terminal device may be implemented by a component (such as a chip or a circuit) that can be used in the second terminal device.

The foregoing mainly describes the solutions provided in embodiments of this application from a perspective of interaction between network elements. Correspondingly, an embodiment of this application further provides a communications apparatus, and the communications apparatus is configured to implement the foregoing methods. The communications apparatus may be the first terminal device in the foregoing method embodiments, an apparatus including the first terminal device, or a component that can be used in the first terminal device. Alternatively, the communications apparatus may be the second terminal device in the foregoing method embodiments, an apparatus including the second terminal device, or a component that can be used in the second terminal device. It may be understood that, to implement the foregoing functions, the communications apparatus includes a corresponding hardware structure and/or software module for performing each function. A person skilled in the art should easily be aware that units and algorithm steps in the examples described with reference to embodiments disclosed in this specification may be implemented by hardware or a combination of hardware and computer software in this application. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In embodiments of this application, the communications apparatus may be divided into function modules based on the foregoing method embodiments. For example, each function module may be obtained through division based on each corresponding function, or two or more functions may be integrated into one processing module. The integrated module may be implemented in a form of hardware, or may be implemented in a form of a software function module. It should be noted that, in this embodiment of this application, division into the modules is an example, and is merely a logic function division. In an actual implementation, another division manner may be used.

Figure 17:
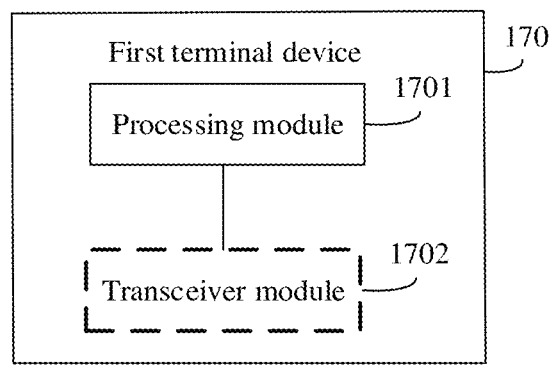
FIG. 17 is a schematic diagram of a structure of a first terminal device according to an embodiment of this application.

For example, the communications apparatus is the terminal device in the foregoing method embodiments. FIG. 17 is a schematic diagram of a structure of a first terminal device 170. The first terminal device 170 includes a processing module 1701. Optionally, the first terminal device 170 may further include a transceiver module 1702. The transceiver module 1702 may also be referred to as a transceiver unit, and is configured to implement a sending and/or receiving function, for example, may be a transceiver circuit, a transceiver, a transceiver, or a communications interface.

The transceiver module 1702 may include a receiving module and a sending module, which are respectively configured to perform receiving steps and sending steps performed by the first terminal device in the foregoing method embodiments. The processing module 1701 may be configured to perform other steps than the receiving steps and sending steps performed by the first terminal device in the foregoing method embodiments.

In a possible implementation, the processing module 1701 is configured to determine an initial time interval and an interval difference; and the processing module 1701 is further configured to determine, based on the initial time interval and the interval difference, a time domain position of a first time-frequency resource used when a first TB is transmitted for the $i^{th}$ time, where i is a positive integer, and $2 \leq i \leq R_{max}+1$. The initial time interval is a time interval between a time domain position at which the first TB is transmitted for the first time and a time domain position at which the first TB is transmitted for the second time, and the interval difference is a difference between a first time interval and a second time interval. The first time interval is a time interval between a time domain position at which the first TB is transmitted for the $k^{th}$ time and a time domain position at which the first TB is transmitted for the $(k+1)^{th}$ time, the second time interval is a time interval between a time domain position at which the first TB is transmitted for the $(k+1)^{th}$ time and a time domain position at which the first TB is transmitted for the $(k+2)^{th}$ time, k is a positive integer, $1 \leq k \leq R_{max}-1$, $R_{max}$ represents a maximum quantity of retransmission times, $R_{max}$ is a positive integer greater than 1, and the interval difference is not 0.

Optionally, the transceiver module 1702 is configured to send the first TB to a second terminal device on the first time-frequency resource.

Optionally, the transceiver module 1702 is further configured to send the initial time interval and the interval difference to the second terminal device.

Optionally, that the processing module 1701 is configured to determine, based on the initial time interval and the interval difference, a time domain position of a first time-frequency resource used when a first TB is transmitted for the $i^{th}$ time includes: The processing module 1701 is configured to determine a target time interval based on the initial time interval and the interval difference; and the processing module 1701 is further configured to determine the time domain position of the first time-frequency resource based on the target time interval and a time domain position at which the first TB is transmitted for the $(i-1)^{th}$ time.

Optionally, the processing module 1701 is further configured to determine a first start frequency domain position set based on a quantity of sub-channels used when the first TB is transmitted for the first time or a start sub-channel index used when the first TB is transmitted for the first time; the processing module 1701 is further configured to determine, based on the first start frequency domain position set, a start frequency domain position of the first time-frequency resource used when the first TB is transmitted for the $i^{th}$ time; and the processing module 1701 is further configured to determine a frequency domain position of the first time-frequency resource based on the start frequency domain position of the first time-frequency resource and the quantity of sub-channels used when the first TB is transmitted for the first time.

In another possible implementation, the processing module 1701 is configured to determine a first start frequency domain position set based on a quantity of sub-channels used when the first TB is transmitted for the first time or a start sub-channel index used when the first TB is transmitted for the first time; the processing module 1701 is further configured to determine, based on the first start frequency domain position set, a start frequency domain position of the first time-frequency resource used when the first TB is transmitted for the $i^{th}$ time, where i is a positive integer, $2 \leq i \leq R_{max}+1$, $R_{max}$ represents a maximum quantity of retransmission times, and $R_{max}$ is a positive integer greater than 1; and the processing module 1701 is further configured to determine a frequency domain position of the first time-frequency resource based on the start frequency domain position of the first time-frequency resource and the quantity of sub-channels used when the first TB is transmitted for the first time. The first start frequency domain position set includes X sub-channel indices, X is a positive integer, and the start sub-channel index used when the first TB is transmitted for the first time is an index of the $1^{st}$ sub-channel used when the first TB is transmitted for the first time.

Optionally, the transceiver module 1702 is configured to send the first TB to the second terminal device on the first time-frequency resource.

Figure 18:
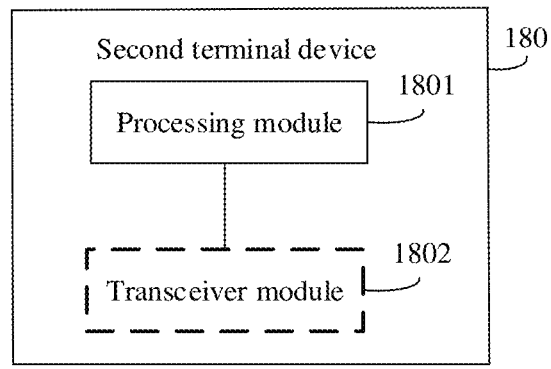
FIG. 18 is a schematic diagram of a structure of a second terminal device according to an embodiment of this application.

Alternatively, for example, the communications apparatus is the second terminal device in the foregoing method embodiments. FIG. 18 is a schematic diagram of a structure of a second terminal device 180. The second terminal device 180 includes a processing module 1801. Optionally, the second terminal device 180 may further include a transceiver module 1802. The transceiver module 1802 may also be referred to as a transceiver unit, and is configured to implement a sending and/or receiving function, for example, may be a transceiver circuit, a transceiver, a transceiver, or a communications interface.

The transceiver module 1802 may include a receiving module and a sending module, which are respectively configured to perform receiving steps and sending steps performed by the second terminal device in the foregoing method embodiments. The processing module 1801 may be configured to perform other steps than the receiving steps and sending steps performed by the second terminal device in the foregoing method embodiments.

In a possible implementation, the processing module 1801 is configured to obtain an initial time interval and an interval difference; and the processing module 1801 is further configured to determine, based on the initial time interval and the interval difference, a time domain position of a first time-frequency resource used when a first TB is transmitted for the $i^{th}$ time, where i is a positive integer, and $2 \leq i \leq R_{max}+1$. The initial time interval is a time interval between a time domain position at which the first TB is transmitted for the first time and a time domain position at which the first TB is transmitted for the second time, and the interval difference is a difference between a first time interval and a second time interval. The first time interval is a time interval between a time domain position at which the first TB is transmitted for the $k^{th}$ time and a time domain position at which the first TB is transmitted for the $(k+1)^{th}$ time, the second time interval is a time interval between a time domain position at which the first TB is transmitted for the $(k+1)^{th}$ time and a time domain position at which the first TB is transmitted for the $(k+2)^{th}$ time, k is a positive integer, $1 \leq k \leq R_{max}-1$, $R_{max}$ represents a maximum quantity of retransmission times, $R_{max}$ is a positive integer greater than 1, and the interval difference is not 0.

Optionally, the transceiver module 1802 is configured to receive the first TB from a first terminal device on the first time-frequency resource.

Optionally, the transceiver module 1802 is further configured to receive the initial time interval and the interval difference from the first terminal device. That the processing module 1801 is configured to obtain an initial time interval and an interval difference includes: The processing module 1801 is configured to obtain the initial time interval and the interval difference that are received by the transceiver module 1802.

Optionally, that the processing module 1801 is configured to determine, based on the initial time interval and the interval difference, a time domain position of a first time-frequency resource used when a first TB is transmitted for the $i^{th}$ time includes: The processing module 1801 is configured to determine a target time interval based on the initial time interval and the interval difference; and the processing module 1801 is further configured to determine the time domain position of the first time-frequency resource based on the target time interval and a time domain position at which the first TB is transmitted for the $(i-1)^{th}$ time.

In another possible implementation, the processing module 1801 is configured to determine a first start frequency domain position set based on a quantity of sub-channels used when the first TB is transmitted for the first time or a start sub-channel index used when the first TB is transmitted for the first time; the processing module 1801 is further configured to determine, based on the first start frequency domain position set, a start frequency domain position of the first time-frequency resource used when the first TB is transmitted for the $i^{th}$ time, where i is a positive integer, $2 \leq i \leq R_{max}+1$, $R_{max}$ represents a maximum quantity of retransmission times, and $R_{max}$ is a positive integer greater than 1; and the processing module 1801 is further configured to determine a frequency domain position of the first time-frequency resource based on the start frequency domain position of the first time-frequency resource and the quantity of sub-channels used when the first TB is transmitted for the first time. The first start frequency domain position set includes X sub-channel indices, X is a positive integer, and the start sub-channel index used when the first TB is transmitted for the first time is an index of the $1^{st}$ sub-channel used when the first TB is transmitted for the first time.

Optionally, the transceiver module 1802 is configured to receive the first TB from the first terminal device on the first time-frequency resource.

Optionally, that the processing module 1701 or the processing module 1801 is configured to determine a first start frequency domain position set based on a quantity of sub-channels used when the first TB is transmitted for the first time includes: The processing module 1701 or the processing module 1801 is configured to determine the first start frequency domain position set based on $L_{subCH}$, $N_{subCH}$, and $R_{max}$, where $L_{subCH}$ is the quantity of sub-channels used when the first TB is transmitted for the first time, and $N_{subCH}$ is a maximum quantity of sub-channels in a frequency domain resource pool.

Optionally, that the processing module 1701 or the processing module 1801 is configured to determine the first start frequency domain position set based on $L_{subCH}$, $N_{subCH}$, and $R_{max}$ includes: The processing module 1701 or the processing module 1801 is configured to determine X+1 sub-channel indices based on $L_{subCH}$, $N_{subCH}$, and $R_{max}$, where the $(X+1)^{th}$ sub-channel index in the X+1 sub-channel indices is the same as the $1^{st}$ sub-channel index in the X+1 sub-channel indices, and first X sub-channel indices in the X+1 sub-channel indices are different from each other; and the processing module 1701 or the processing module 1801 is further configured to determine the first X sub-channel indices as sub-channel indices constituting the first start frequency domain position set.

Optionally, that the processing module 1701 or the processing module 1801 is further configured to determine, based on the first start frequency domain position set, a start frequency domain position of the first time-frequency resource used when the first TB is transmitted for the $i^{th}$ time includes: If X is greater than or equal to i, the processing module 1701 or the processing module 1801 is configured to determine, as the start frequency domain position of the first time-frequency resource, a sub-channel indicated by a sub-channel index that is in a second start frequency domain position set and that has a longest Euclidean distance from a start sub-channel index used when the first TB is transmitted for the $(i-1)^{th}$ time, and the processing module is further configured to delete, from the second start frequency domain position set, the sub-channel index corresponding to the start frequency domain position of the first time-frequency resource, where an initial set of the second start frequency domain position set includes a sub-channel index in the first start frequency domain position set other than the $1^{st}$ sub-channel index in the first start frequency domain position set.

If X is less than i, the processing module 1701 or the processing module 1801 is configured to determine, as the start frequency domain position of the first time-frequency resource, a sub-channel indicated by a sub-channel index that is in the $n^{th}$ third start frequency domain position set and that has a longest Euclidean distance from a start sub-channel index used when the first TB is transmitted for the $(i-1)^{th}$ time, and the processing module is further configured to delete, from the $n^{th}$ third start frequency domain position set, the sub-channel index corresponding to the start frequency domain position of the first time-frequency resource, where an initial set of the $n^{th}$ third start frequency domain position set is the same as the first start frequency domain position set, $n=\lceil i/X \rceil - 1$, and $\lceil \ \rceil$ represents a ceiling operation.

Optionally, that the processing module 1701 or the processing module 1801 is configured to determine a first start frequency domain position set based on a start sub-channel index used when the first TB is transmitted for the first time includes: The processing module 1701 or the processing module 1801 is configured to determine the first start frequency domain position set based on the start sub-channel index used when the first TB is transmitted for the first time and a first number sequence, where the first number sequence includes $N_{subCH}$ sub-channel indices, the $N_{subCH}$ sub-channel indices include the start sub-channel index used when the first TB is transmitted for the first time, the $N_{subCH}$ sub-channel indices are different from each other, and $N_{subCH}$ is a maximum quantity of sub-channels in the frequency domain resource pool.

Optionally, that the processing module 1701 or the processing module 1801 is configured to determine the first start frequency domain position set based on the start sub-channel index used when the first TB is transmitted for the first time and a first number sequence includes: The processing module 1701 or the processing module 1801 is configured to convert the first number sequence into a second number sequence according to a preset rule; the processing module 1701 or the processing module 1801 is further configured to determine a first sub-channel index, where the first sub-channel index is a sub-channel index that is in the second number sequence and that corresponds to the start sub-channel index used when the first TB is transmitted for the first time; and the processing module 1701 or the processing module 1801 is further configured to determine the first start frequency domain position set based on the first sub-channel index and the second number sequence, where each sub-channel index in the first start frequency domain position set is less than or equal to a first value.

Optionally, a value of X is $R_{max}$, and that the processing module 1701 or the processing module 1801 is further configured to determine the first start frequency domain position set based on the first sub-channel index and the second number sequence includes: If the first sub-channel index is less than or equal to the first value, the processing module 1701 or the processing module 1801 is configured to determine the first sub-channel index as the $1^{st}$ sub-channel index in the first start frequency domain position set; or if the first sub-channel index is greater than the first value, the processing module 1701 or the processing module 1801 is configured to determine, as the $1^{st}$ sub-channel index in the first start frequency domain position set, a next sub-channel index that is less than or equal to the first value and that is closest to the first sub-channel index in the second number sequence, where a next sub-channel index that is in the second number sequence and that is closest to the last sub-channel index in the second number sequence is the $1^{st}$ sub-channel index in the second number sequence; and the processing module 1701 or the processing module 1801 is further configured to determine, as the $(m+1)^{th}$ sub-channel index in the first start frequency domain position set, a next sub-channel index that is in the second number sequence, that is closest to the $m^{th}$ sub-channel index in the first start frequency domain position set, and that is less than or equal to the first value, where m is a positive integer ranging from 1 to X−1.

Optionally, that the processing module 1701 or the processing module 1801 is further configured to determine, based on the first start frequency domain position set, a start frequency domain position of the first time-frequency resource used when the first TB is transmitted for the $i^{th}$ time includes: The processing module 1701 or the processing module 1801 is further configured to determine, as the start frequency domain position of the first time-frequency resource, a sub-channel indicated by the $(i-1)^{th}$ sub-channel index in the first start frequency domain position set.

All related content of the steps in the foregoing method embodiments may be cited in function descriptions of corresponding function modules. Details are not described herein again.

In this embodiment, the first terminal device 170 is presented in a form of function modules obtained through division in an integrated manner. The "module" herein may be a specific ASIC, a circuit, a processor and a memory that execute one or more software or firmware programs, an integrated logic circuit, and/or another component that may provide the foregoing functions. In a simple embodiment, a person skilled in the art may imagine that the first terminal device 170 may be in a form of the communications apparatus 50 shown in FIG. 2.

For example, the processor 501 in the communications apparatus 50 shown in FIG. 2 may invoke the computer-executable instructions stored in the memory 503, so that the communications apparatus 50 performs the data transmission resource determining method in the foregoing method embodiments.

Specifically, a function/an implementation process of the processing module 1701 and the transceiver module 1702 in FIG. 17 may be implemented by invoking, by the processor 501 in the communications apparatus 50 shown in FIG. 2, the computer-executable instructions stored in the memory 503. Alternatively, a function/an implementation process of the processing module 1701 in FIG. 17 may be implemented by invoking, by the processor 501 in the communications apparatus 50 shown in FIG. 2, the computer-executable instructions stored in the memory 503, and a function/an implementation process of the transceiver module 1702 in FIG. 17 may be implemented by using the communications interface 504 in the communications apparatus 50 shown in FIG. 2.

The first terminal device 170 provided in the embodiments can perform the foregoing data transmission resource determining method. Therefore, for a technical effect that can be achieved by the first terminal device 170, refer to the foregoing method embodiments. Details are not described herein again.

In this embodiment, the second terminal device 180 is presented in a form of function modules obtained through division in an integrated manner. The "module" herein may be a specific ASIC, a circuit, a processor and a memory that execute one or more software or firmware programs, an integrated logic circuit, and/or another component that may provide the foregoing functions. In a simple embodiment, a person skilled in the art may imagine that the second terminal device 180 may be in a form of the communications apparatus 50 shown in FIG. 2.

For example, the processor 501 in the communications apparatus 50 shown in FIG. 2 may invoke the computer-executable instructions stored in the memory 503, so that the communications apparatus 50 performs the data transmission resource determining method in the foregoing method embodiments.

Specifically, a function/an implementation process of the processing module 1801 and the transceiver module 1802 in FIG. 18 may be implemented by invoking, by the processor 501 in the communications apparatus 50 shown in FIG. 2, the computer-executable instructions stored in the memory 503. Alternatively, a function/an implementation process of the processing module 1801 in FIG. 18 may be implemented by invoking, by the processor 501 in the communications apparatus 50 shown in FIG. 2, the computer-executable instructions stored in the memory 503, and a function/an implementation process of the transceiver module 1802 in FIG. 18 may be implemented by using the communications interface 504 in the communications apparatus 50 shown in FIG. 2.

The second terminal device 180 provided in the embodiments can perform the foregoing data transmission resource determining method. Therefore, for a technical effect that can be achieved by the second terminal device 180, refer to the foregoing method embodiments. Details are not described herein again.

Optionally, an embodiment of this application further provides a communications apparatus (for example, the communications apparatus may be a chip or a chip system). The communications apparatus includes a processor, configured to implement the method in any one of the foregoing method embodiments. In a possible design, the communications apparatus further includes a memory. The memory is configured to store necessary program instructions and data. The processor may invoke the program code stored in the memory, to indicate the communications apparatus to perform the method in any one of the foregoing method embodiments. Certainly, the memory may not be located in the communications apparatus. In another possible design, the communication apparatus further includes an interface circuit. The interface circuit is a code/data read/write interface circuit, and the interface circuit is configured to: receive computer-executable instructions (where the computer-executable instructions are stored in a memory, may be directly read from the memory, or may pass through another component), and transmit the computer-executable instructions to the processor. When the communication apparatus is a chip system, the chip system may include a chip, or include a chip and another discrete component. This is not specifically limited in this embodiment of this application.

All or some of the foregoing embodiments may be implemented by software, hardware, firmware, or any combination thereof. When a software program is used to implement the embodiments, all or a part of the embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like. In this embodiment of this application, the computer may include the apparatuses described above.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and the accompanying drawings are merely example descriptions of this application defined by the appended claims, and are considered as any of or all modifications, variations, combinations or equivalents that cover the scope of this application. It is clear that a person skilled in the art may make various modifications and variations to this application without departing from the spirit and scope of this application. This application is intended to cover these modifications and variations of this application provided that they fall within the scope of protection defined by the following claims and their equivalent technologies.

What is claimed is:

1. A method, wherein the method comprises:
    determining an initial time interval and an interval difference, wherein the initial time interval is a time interval between a time domain position at which a first transport block (TB) is transmitted for the first time and a time domain position at which the first TB is transmitted for the second time, the interval difference is a difference between a first time interval and a second time interval, the first time interval is a time interval between a time domain position at which the first TB is transmitted for a $k^{th}$ time and a time domain position at which the first TB is transmitted for a $(k+1)^{th}$ time, the second time interval is a time interval between the time domain position at which the first TB is transmitted for the $(k+1)^{th}$ and a time domain position at which the first TB is transmitted for a $(k+2)^{th}$ time, where k is a positive integer, $1 \leq k \leq R_{max}-1$, and $R_{max}$ represents a maximum quantity of retransmission times, where $R_{max}$ is a positive integer greater than 1, and the interval difference fails to be equal to 0; and determining, based on the initial time interval and the interval difference, a time domain position of a first time-frequency resource in response to the first TB being transmitted for an $i^{th}$ time, wherein i is a positive integer, and $2 \leq i \leq R_{max}+1$.

2. The method according to claim 1, wherein the method further comprises:
sending the initial time interval and the interval difference.

3. The method according to claim 1, wherein the determining, based on the initial time interval and the interval difference, the time domain position of the first time-frequency resource in response to the first TB being transmitted for the $i^{th}$ time comprises:
determining a target time interval based on the initial time interval and the interval difference, wherein the target time interval is a time interval between a time domain position at which the first TB is transmitted for the $i^{th}$ time and a time domain position at which the first TB is transmitted for an $(i-1)^{th}$ time; and
determining the time domain position of the first time-frequency resource based on the target time interval and the time domain position at which the first TB is transmitted for the $(i-1)^{th}$ time.

4. The method according to claim 3, wherein the target time interval satisfies a following relationship:

$$T_{i-1} = (i-2) * TD_{gap} + TI_{gap},$$

wherein
$T_{i-1}$ is the target time interval, $TI_{gap}$ is the initial time interval, and $TD_{gap}$ is the interval difference.

5. The method according to claim 3, wherein the time domain position of the first time-frequency resource satisfies a following relationship:

$$t_i^{SL} = (t_{i-1}^{SL} + T_{i-1}) \% t_{T_{MAX}}^{SL},$$

wherein
$t_i^{SL}$ is the time domain position of the first time-frequency resource, $t_{i-1}^{SL}$ is the time domain position at which the first TB is transmitted for the $(i-1)^{th}$ time, $T_{i-1}$ is the target time interval, $T_{T_{MAX}}^{SL}$ is a maximum length of a time domain resource pool, and % represents a remainder operation.

6. A method, wherein the method comprises:
determining an initial time interval and an interval difference, wherein the initial time interval is a time interval between a time domain position at which a first transport block (TB) is transmitted for the first time and a time domain position at which the first TB is transmitted for the second time, the interval difference is a difference between a first time interval and a second time interval, the first time interval is a time interval between a time domain position at which the first TB is transmitted for a $k^{th}$ time and a time domain position at which the first TB is transmitted for a $(k+1)^{th}$ time, the second time interval is a time interval between the time domain position at which the first TB is transmitted for the $(k+1)^{th}$ time and a time domain position at which the first TB is transmitted for a $(k+2)^{th}$ time, where k is a positive integer, $1 \leq k \leq R_{max}-1$, and $R_{max}$ represents a maximum quantity of retransmission times, where $R_{max}$ is a positive integer greater than 1, and the interval difference fails to be equal to 0; and determining, based on the initial time interval and the interval difference, a time domain position of a first time-frequency resource in response to the first TB being transmitted for an $i^{th}$ time, wherein i is a positive integer, and $2 \leq i \leq R_{max}+1$.

7. The method according to claim 6, wherein the obtaining the initial time interval and the interval difference comprises:
receiving the initial time interval and the interval difference.

8. The method according to claim 6, wherein the method further comprises:
determining a first start frequency domain position set based on a quantity of sub-channels in response to the first TB being transmitted for the first time or a start sub-channel index in response to the first TB being transmitted for the first time, wherein a frequency domain resource pool comprises a plurality of sub-channels, the first start frequency domain position set comprises X sub-channel indices, where X is a positive integer, and the start sub-channel index is an index of a $1^{st}$ sub-channel in response to the first TB being transmitted for the first time;
determining, based on the first start frequency domain position set, a start frequency domain position of the first time-frequency resource in response to the first TB being transmitted for the $i^{th}$ time; and
determining a frequency domain position of the first time-frequency resource based on the start frequency domain position of the first time-frequency resource and the quantity of sub-channels in response to the first TB being transmitted for the first time.

9. The method according to claim 8, wherein the determining the first start frequency domain position set based on the quantity of sub-channels in response to the first TB being transmitted for the first time comprises:
determining the first start frequency domain position set based on $L_{subCH}$, $N_{subCH}$, and $R_{max}$, wherein $L_{subCH}$ is the quantity of sub-channels in response to the first TB being transmitted for the first time, and $N_{subCH}$ is a maximum quantity of sub-channels in the frequency domain resource pool.

10. The method according to claim 9, wherein the determining the first start frequency domain position set based on $L_{subCH}$, $N_{subCH}$, and $R_{max}$ comprises:
determining X+1 sub-channel indices based on $L_{subCH}$, $N_{subCH}$, and $R_{max}$, wherein an $(X+1)^{th}$ sub-channel index in the X+1 sub-channel indices is the same as a $1^{st}$ sub-channel index in the X+1 sub-channel indices, and first X sub-channel indices in the X+1 sub-channel indices are different from each other; and
determining the first X sub-channel indices as sub-channel indices constituting the first start frequency domain position set.

11. A communication apparatus, wherein the apparatus comprises:
- at least one processor;
- at least one memory, wherein the at least one memory is configured to store non-transitory instructions, and in response to being executed by the at least one processor cause the communication apparatus to perform operations comprising:
- determining an initial time interval and an interval difference, wherein the initial time interval is a time interval between a time domain position at which a first transport block (TB) is transmitted for the first time and a time domain position at which the first TB is transmitted for the second time, the interval difference is a difference between a first time interval and a second time interval, the first time interval is a time interval between a time domain position at which the first TB is transmitted for a $k^{th}$ time and a time domain position at which the first TB is transmitted for a $(k+1)^{th}$ time, the second time interval is a time interval between the time domain position at which the first TB is transmitted for the $(k+1)^{th}$ time and a time domain position at which the first TB is transmitted for a $(k+2)^{th}$ time, where k is a positive integer, $1 \le k \le R_{max}-1$, and $R_{max}$ represents a maximum quantity of retransmission times, where $R_{max}$ is a positive integer greater than 1, and the interval difference fails to be equal to 0; and
- determining based on the initial time interval and the interval difference, a time domain position of a first time-frequency resource in response to the first TB being transmitted for an $i^{th}$ time, wherein i is a positive integer, and $2 \le i \le R_{max}+1$.

12. The communication apparatus according to claim 11, wherein the non-transitory instructions further cause the communication apparatus to perform operations further comprising:
- sending the initial time interval and the interval difference.

13. The communication apparatus according to claim 11, wherein the determining based on the initial time interval and the interval difference, the time domain position of the first time-frequency resource in response to the first TB being transmitted for the $i^{th}$ time comprises the communication apparatus being further configured to perform operations further comprising:
- determining a target time interval based on the initial time interval and the interval difference, wherein the target time interval is a time interval between a time domain position at which the first TB is transmitted for the $i^{th}$ time and a time domain position at which the first TB is transmitted for an $(i-1)^{th}$ time; and
- determining the time domain position of the first time-frequency resource based on the target time interval and the time domain position at which the first TB is transmitted for the $(i-1)^{th}$ time.

14. The communication apparatus according to claim 13, wherein the target time interval satisfies a following relationship:

$$T_{i-1} = (i-2) * TD_{gap} + TI_{gap},$$

wherein
$T_{i-1}$ is the target time interval, $TI_{gap}$ is the initial time interval, and $TD_{gap}$ is the interval difference.

15. The communication apparatus according to claim 13, wherein the time domain position of the first time-frequency resource satisfies a following relationship:

$$t_i^{SL} = (t_{i-1}^{SL} + T_{i-1}) \% t_{T_{MAX}}^{SL},$$

wherein
$t_i^{SL}$ is the time domain position of the first time-frequency resource, $t_{i-1}^{SL}$ is the time domain position at which the first TB is transmitted for the $(i-1)^{th}$ time, $T_{i-1}$ is the target time interval, $t_{T_{MAX}}^{SL}$ is a maximum length of a time domain resource pool, and % represents a remainder operation.

16. A communication apparatus, wherein the apparatus comprises:
- at least one processor;
- at least one memory, wherein the at least one memory is configured to store non-transitory instructions, and in response to being executed by the at least one processor cause the communication apparatus to perform operations comprising:
- obtaining an initial time interval and an interval difference, wherein the initial time interval is a time interval between a time domain position at which a first transport block (TB) is transmitted for the first time and a time domain position at which the first TB is transmitted for the second time, the interval difference is a difference between a first time interval and a second time interval, the first time interval is a time interval between a time domain position at which the first TB is transmitted for a $k^{th}$ time and a time domain position at which the first TB is transmitted for a $(k+1)^{th}$ time,
- the second time interval is a time interval between the time domain position at which the first TB is transmitted for the $(k+1)^{th}$ time and a time domain position at which the first TB is transmitted for a $(k+2)^{th}$ time, where k is a positive integer, $1 \le k \le R_{max}-1$, and $R_{max}$ represents a maximum quantity of retransmission times, where $R_{max}$ is a positive integer greater than 1, and the interval difference fails to be equal to 0; and
- determining, based on the initial time interval and the interval difference, a time domain position of a first time-frequency resource in response to the first TB being transmitted for an $i^{th}$ time, wherein i is a positive integer, and $2 \le i \le R_{max}+1$.

17. The communication apparatus according to claim 16, wherein the non-transitory instructions further cause the communication apparatus to perform operations further comprising:
- receiving the initial time interval and the interval difference.

18. The communication apparatus according to claim 16, wherein the non-transitory instructions further cause the communication apparatus to perform operations further comprising:
- determining a first start frequency domain position set based on a quantity of sub-channels in response to the first TB being transmitted for the first time or a start sub-channel index in response to the first TB being transmitted for the first time, wherein a frequency domain resource pool comprises a plurality of sub-channels, the first start frequency domain position set comprises X sub-channel indices, where X is a positive integer, and the start sub-channel index is an index of a $1^{st}$ sub-channel in response to the first TB being transmitted for the first time;

determining, based on the first start frequency domain position set, a start frequency domain position of the first time-frequency resource in response to the first TB being transmitted for the $i^{th}$ time; and determining a frequency domain position of the first time-frequency resource based on the start frequency domain position of the first time-frequency resource and the quantity of sub-channels in response to the first TB being transmitted for the first time.

19. The communication apparatus according to claim 18, wherein the determining the first start frequency domain position set based on the quantity of sub-channels in response to the first TB being transmitted for the first time comprises the communication apparatus being further configured to perform operations further comprising:

determining the first start frequency domain position set based on $L_{subCH}$, $N_{subCH}$, and $R_{max}$, wherein $L_{subCH}$ is the quantity of sub-channels in response to the first TB being transmitted for the first time, and $N_{subCH}$ is a maximum quantity of sub-channels in the frequency domain resource pool.

20. The communication apparatus according to claim 19, wherein the determining the first start frequency domain position set based on $L_{subCH}$, $N_{subCH}$, and $R_{max}$ comprises the communication apparatus being further configured to perform operations further comprising:

determining X+1 sub-channel indices based on $L_{subCH}$, $N_{subCH}$, and $R_{max}$, wherein an $(X+1)^{th}$ sub-channel index in the X+1 sub-channel indices is the same as a $1^{st}$ sub-channel index in the X+1 sub-channel indices, and first X sub-channel indices in the X+1 sub-channel indices are different from each other; and determining the first X sub-channel indices as sub-channel indices constituting the first start frequency domain position set.

* * * * *